US012017136B2

(12) United States Patent
Khanna et al.

(10) Patent No.: US 12,017,136 B2
(45) Date of Patent: Jun. 25, 2024

(54) BOWLING ENHANCEMENT SYSTEM WITH MOBILE DEVICE PAIRING AND RELATED METHODS

(71) Applicant: CRUNCHY LOGISTICS LLC, Orlando, FL (US)

(72) Inventors: Adi Khanna, Orlando, FL (US); Neil Dufva, Orlando, FL (US); Leonardo Moretti, Orlando, FL (US); Mario Felizola, Orlando, FL (US)

(73) Assignee: CRUNCHY LOGISTICS LLC, Orlando, FL (US)

( * ) Notice: Subject to any disclaimer, the term of this patent is extended or adjusted under 35 U.S.C. 154(b) by 0 days.

(21) Appl. No.: 18/295,310

(22) Filed: Apr. 4, 2023

(65) Prior Publication Data
US 2023/0233925 A1   Jul. 27, 2023

Related U.S. Application Data

(63) Continuation of application No. 16/909,118, filed on Jun. 23, 2020, now Pat. No. 11,660,524.
(Continued)

(51) Int. Cl.
*A63D 5/04* (2006.01)
*A63B 69/00* (2006.01)
*G06K 19/06* (2006.01)

(52) U.S. Cl.
CPC ............ *A63D 5/04* (2013.01); *A63B 69/0046* (2013.01); *G06K 19/06037* (2013.01);
(Continued)

(58) Field of Classification Search
CPC ................ A63D 5/04; A63D 2005/042; A63D 2005/044; A63B 69/0046
See application file for complete search history.

(56) References Cited

U.S. PATENT DOCUMENTS 6,270,421 B1   8/2001  Tsujita
7,598,684 B2  10/2009  Lys et al.
(Continued)

FOREIGN PATENT DOCUMENTS

JP  2006-043083   2/2006
JP  2011-128768   6/2011
(Continued)

OTHER PUBLICATIONS

Crunchy Tech "Unreal Bowling—Interactive Experience with Projection" Dec. 30, 2015 https://www.youtube.com/watch?v=gkuIoQ-hbIM **See U.S. Appl. No. 16/909,118.
(Continued)

*Primary Examiner* — William M Pierce
(74) *Attorney, Agent, or Firm* — Allen, Dyer, Doppelt + Gilchrist, PA

(57) ABSTRACT

A bowling enhancement system is for a bowling lane, and may include a mobile device, an image sensor arranged over the bowling lane and configured to generate image data of the bowling lane, projectors arranged over the bowling lane and configured to generate a set of projected images onto the bowling lane, and a server. The server may be configured to cause a given projector to project a pairing token onto the bowling lane, when receiving the pairing token from the mobile device, establish a communication link with the mobile device to receive a given game characteristic from the mobile wireless communications device, determine a tracking path of a bowling ball traveling on the bowling lane based upon the image data, and selectively change the set of projected images based upon the tracking path of the bowling ball and the given game characteristic.

20 Claims, 27 Drawing Sheets

Related U.S. Application Data

(60) Provisional application No. 62/866,239, filed on Jun. 25, 2019.

(52) U.S. Cl.
CPC .... *A63B 2225/54* (2013.01); *A63D 2005/042* (2013.01); *A63D 2005/044* (2013.01)

(56) References Cited

U.S. PATENT DOCUMENTS

| | | |
|---|---|---|
| 7,775,883 B2 | 8/2010 | Smoot et al. |
| 8,292,733 B2 | 10/2012 | Crawford et al. |
| 8,771,094 B2 | 7/2014 | Meigs et al. |
| 8,864,606 B2 | 10/2014 | Chan et al. |
| 8,935,777 B2 | 1/2015 | DeSoto et al. |
| 2007/0184908 A1 | 8/2007 | Hansen |
| 2009/0280916 A1 | 11/2009 | Zambelli |
| 2013/0032634 A1 | 2/2013 | McKirdy |
| 2013/0324272 A1 | 12/2013 | Vaioli et al. |
| 2014/0340205 A1 | 11/2014 | Meigs et al. |
| 2015/0297976 A1 | 10/2015 | Bovino |
| 2015/0301509 A1 | 10/2015 | Bovino et al. |
| 2015/0367227 A1 | 12/2015 | Vaioli et al. |
| 2016/0310828 A1 | 10/2016 | Qiao et al. |
| 2020/0401297 A1 | 12/2020 | Tapadia |
| 2020/0406123 A1 | 12/2020 | Khanna et al. |

FOREIGN PATENT DOCUMENTS

| | | |
|---|---|---|
| KR | 20120035362 | 4/2012 |
| WO | WO9955437 A1 | 11/1999 |

OTHER PUBLICATIONS

CrunchyLogistics "Interactive Bowling experience (iBowl) in Orlando FL" https://www.youtube.com/watch?v=13TIW7zXMI4 Dec. 2, 2011 **See U.S. Appl. No. 16/909,118.

Brunswick, Openlane App, https://brunswickbowling.com/bowling-centers/equipment-products-supplies/open-lane, https://web.archive.org/web/20200511094757/https://brunswickbowling.com/bowling-centers/equipment-products-supplies/open-lane, May 2020. **** See U.S. Appl. No. 16/909,118.

Derksen Lichttechnik, Installed Projection Systems, https://www.derksen.de/en/portfolio-items/heinz-nixdorf-museumsforum/, Jun. 2015 ***See U.S. Appl. No. 16/909,118.

BOWLING ENHANCEMENT SYSTEM WITH MOBILE DEVICE PAIRING AND RELATED METHODS

RELATED APPLICATIONS

This application is a continuation of application Ser. No. 16/909,118 filed Jun. 23, 2020, which claims the benefit of U.S. provisional application Ser. No. 62/866,239 filed Jun. 25, 2019, which are hereby incorporated herein in their entirety by reference.

TECHNICAL FIELD

The present disclosure relates to the field of recreational gaming systems, and, more particularly, to a bowling enhancement system and related methods.

BACKGROUND

Bowling is a game with a long and storied history dating back to Ancient Egypt. The typical forum for the game is a bowling center, which is an indoor facility with a plurality of bowling lanes. Typically, the setting of the pins and ball return is fully automated along with scoring. In the late 20th century, the game of bowling underwent some modernization to improve popularity, i.e. bowling enhancement. For example, animations would be displayed on electronic scoreboard screens, and bowling centers installed live entertainment feeds into these same displays. Some bowling centers even installed lighting effects to enhance the game.

In recent years, this bowling enhancement has deepened with effects being displayed in real time based upon action within the game itself. In one advantageous approach by the present application's assignee, the bowling bowl would be tracked as it traveled down the bowling lane, and projectors would display effects on the bowling lane in real time.

SUMMARY

Generally, a bowling enhancement system is for at least one bowling lane. The bowling enhancement system comprises a computing device, a mobile wireless communications device, and at least one sensor arranged over the at least one bowling lane and configured to generate image data of the at least one bowling lane. The bowling enhancement system comprises at least one projector arranged over the at least one bowling lane and configured to generate a set of projected images onto the at least one bowling lane, a local server coupled to the at least one sensor, the at least one projector, and the computing device, and a cloud platform cooperating with the local server. The local server is configured to generate a pairing token and transmit the pairing token to a given projector, the given projector being adjacent a foul line of the at least one bowling lane, and cause the given projector to project the pairing token onto the at least one bowling lane behind the foul line on an approach. The mobile wireless communications device is configured to ingest the pairing token. The local server is configured to when receiving the pairing token from the mobile wireless communications device through the cloud platform and when authenticating the pairing token for the at least one bowling lane, establish a communication link between the mobile wireless communications device and the local server via the cloud platform, and cause the mobile wireless communications device to display a user interface menu for selecting a plurality of game characteristics for a bowling game. The plurality of game characteristics for the bowling game comprises a plurality of bowling bowl animations, and a plurality of bowling lane backgrounds. The local server is also configured to receive the selected game characteristics from the mobile wireless communications device via the cloud platform, initialize the bowling game for the at least one bowling lane based upon the selected game characteristics, determine a tracking path of a bowling ball traveling on the at least one bowling lane based upon the image data of the at least one bowling lane, and selectively change the set of projected images based upon the tracking path of the bowling ball and the selected game characteristics. The computing device is configured to disable the at least one bowling lane for the mobile wireless communications device.

In some embodiments, the bowling enhancement system also comprises a plurality of speakers coupled to the local server and configured to output corrective prompts to a user when errors occur during establishing the communication link between the mobile wireless communications device and the local server via the cloud platform. The local server and the cloud platform may be configured to present corrective prompts to a user. The user interface menu may be configured to receive a text message for display in the set of projected images.

For example, the plurality of bowling lane backgrounds may comprise a live bowling lane background, a static bowling lane background, and a user-specific bowling lane background. The pairing token may comprise at least one of a quick response (QR) code, a bar code, and an alphanumeric text string. The mobile wireless communications device may comprise an image sensor configured to ingest the pairing token. The at least one bowling lane may comprise a plurality of bowling lanes. The at least one projector is arranged over the plurality of bowling lanes and configured to generate a plurality of sets of projected images onto the plurality of bowling lanes. The at least one bowling lane comprises a plurality of bowling lanes, and the local server may be configured to generate respective unique pairing tokens for each bowling lane.

Another aspect is directed to a bowling system for at least one bowling lane having a computing device, a mobile wireless communications device, and a cloud platform cooperating with the computing device and the mobile wireless communications device. The bowling system comprises at least one sensor arranged over the at least one bowling lane and configured to generate image data of the at least one bowling lane, at least one projector arranged over the at least one bowling lane and configured to generate a set of projected images onto the at least one bowling lane, and a local server cooperating with the cloud platform and coupled to the at least one sensor, the at least one projector, and the computing device. The local server is configured to generate a pairing token and transmit the pairing token to a given projector. The given projector is adjacent a foul line of the at least one bowling lane. The local server is configured to cause the given projector to project the pairing token onto the at least one bowling lane behind the foul line on an approach. The mobile wireless communications device is configured to ingest the pairing token. The local server is configured to when receiving the pairing token from the mobile wireless communications device through the cloud platform and when authenticating the pairing token for the at least one bowling lane, and establish a communication link between the mobile wireless communications device and the local server via the cloud platform, and cause the mobile wireless communications device to display a user interface menu for selecting a plurality of game characteristics for a bowling game. The plurality of game characteristics for the bowling game comprises a plurality of bowling bowl animations, and a plurality of bowling lane backgrounds. The local server is configured receive the selected game characteristics from the mobile wireless communications device via the cloud platform, initialize the bowling game for the at least one bowling lane based upon the selected game characteristics, determine a tracking path of a bowling ball traveling on the at least one bowling lane based upon the image data of the at least one bowling lane, and selectively change the set of projected images based upon the tracking path of the bowling ball and the selected game characteristics. The computing device is configured to disable the at least one bowling lane for the mobile wireless communications device.

Yet another aspect is directed to a method for operating a bowling enhancement system for at least one bowling lane. The method comprises using at least one sensor to generate image data of at least one bowling lane, operating at least one projector to generate a set of projected images onto the at least one bowling lane, and operating a local server cooperating with a cloud platform for generating a pairing token and transmit the pairing token to a given projector. The given projector is adjacent a foul line of the at least one bowling lane. The method includes operating the local server for causing a given projector to project the pairing token onto the at least one bowling lane behind the foul line on an approach for ingestion by a mobile wireless communications device, and when receiving the pairing token from the mobile wireless communications device through the cloud platform and when authenticating the pairing token for the at least one bowling lane. The method includes operating the local server for establishing a communication link between the mobile wireless communications device and the local server via the cloud platform, and causing the mobile wireless communications device to display a user interface menu for selecting a plurality of game characteristics for a bowling game. The plurality of game characteristics for the bowling game comprises a plurality of bowling bowl animations, and a plurality of bowling lane backgrounds. The method includes operating the local server for receiving the selected game characteristics from the mobile wireless communications device via the cloud platform, initializing the bowling game for the at least one bowling lane based upon the selected game characteristics, determining a tracking path of a bowling ball traveling on the at least one bowling lane based upon the image data of the at least one bowling lane, and selectively changing the set of projected images based upon the tracking path of the bowling ball and the selected game characteristics. The method comprises operating a computing device to disable the at least one bowling lane for the mobile wireless communications device.

DETAILED DESCRIPTION

Figure 1:
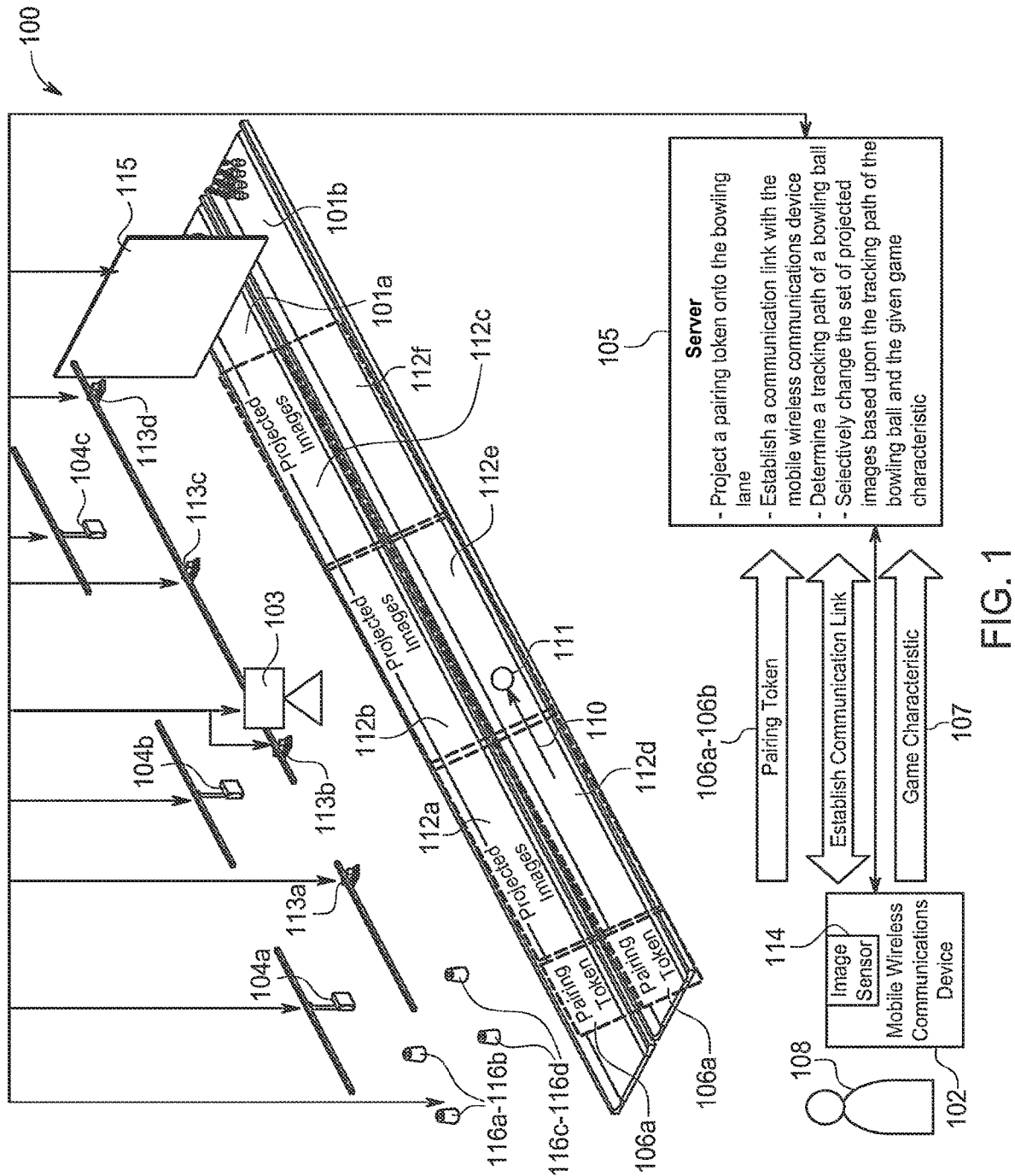
FIG. 1 is a schematic diagram of a bowling enhancement system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a bowling enhancement system 100 according to the present disclosure is now described. The bowling enhancement system 100 is illustratively for first and second bowling lanes 101*a*-101*b*. Broadly, the bowling enhancement system 100 generates a plurality of bowling bowl animations, and a plurality of bowling lane backgrounds on the first and second bowling lanes 101*a*-101*b* based upon a movement of a bowling ball 111.

The bowling enhancement system 100 illustratively includes a mobile wireless communications device 102 associated with a user 108. The mobile wireless communications device 102 may comprise a handheld cellular device, a tablet computing device, or a laptop computing device, for example.

The mobile wireless communications device 102 illustratively comprises an image sensor 114, and may also comprise, not shown, a display, a processor, a memory, and one or more wireless transceivers (e.g. cellular, IEEE 802.11 (WiFi), Bluetooth, and Near Field Communications (NFC)). As will be appreciated, the image sensor 114 is sensitive to at least the visible portion of the electromagnetic spectrum (i.e. wavelengths from about 380 to 740 nanometers).

The bowling enhancement system 100 illustratively comprises an image sensor 103 arranged over the first and second bowling lanes 101*a*-101*b* and configured to generate image data of the first and second bowling lanes. In some embodiments, the bowling enhancement system 100 may comprise a plurality of image sensors. Regardless of the number, the field of view for the image sensor 103 should include the entirety or at least greater than a threshold percentage of the first and second bowling lanes 101*a*-101*b*. In particular, the image sensor 103 is configured to monitor the state of gameplay of the bowling game.

The bowling enhancement system 100 illustratively comprises a plurality of light sources 113*a*-113*d* configured to irradiate the first and second bowling lanes 101*a*-101*b*. In some embodiments, each light source 113*a*-113*d* may comprise an IR light source, and the image sensor 103 may comprise an IR image sensor (i.e. sensitive to the IR range of the electromagnetic spectrum).

The bowling enhancement system 100 illustratively includes a plurality of projectors 104a-104c arranged over the first and second bowling lanes 101a-101b and configured to generate a set of projected images 112a-112f onto the first and second bowling lanes. The bowling enhancement system 100 illustratively comprises a plurality of speakers 116a-116d arranged adjacent a foul line of the first and second bowling lanes 101a-101b, and a display 115 positioned at a back end of the first and second bowling lanes.

The bowling enhancement system 100 illustratively includes a server 105 coupled to the image sensor 103, the plurality of projectors 104a-104c, the plurality of light sources 113a-113d, the plurality of speakers 116a-116d, and the display 115. In some embodiments, the server 105 may be coupled to each of these devices via a wired connection, but other embodiments may employ wireless connections partially or fully.

The server 105 is illustratively stored locally at the bowling center housing the first and second bowling lanes 101a-101b. But in other embodiments, the server 105 may alternatively be provided solely or partially via a cloud computing platform. For example, in the embodiments of FIGS. 2-8, the server 105 differently comprises both a local computing element and a cloud computing element cooperating therewith.

The server 105 is configured to cause a given projector 104a to project a pairing token 106a-106b onto the first and second bowling lanes 101a-101b adjacent the foul line. For example, the pairing token 106a-106b comprises at least one of a QR code (See FIGS. 2-8 & 10-13), a bar code, and an alphanumeric text string. The pairing token need only uniquely identify a respective bowling lane, and could comprise other forms.

The mobile wireless communications device 102 is configured to ingest the pairing token 106a-106 via the image sensor 114. The server 105 is configured to when receiving the pairing token 106a-106b from the mobile wireless communications device 102, establish a communication link with the mobile wireless communications device. In some embodiments, the mobile wireless communications device 102 may communicate with the server 105 via the Internet (e.g. using the cellular network or a wireless local area network (WLAN)). In other embodiments, the mobile wireless communications device 102 may communicate with the server 105 via a direct local wireless connection.

As will be appreciated, the plurality of speakers 116a-116d is configured to present audio based prompts to the user 108 from the server 105. Additionally, the display 115 is configured to present visual prompts to the user 108 from the server 105. Positively, if there are any errors with the establishment of the communication link, the server 105 is configured to present corrective audio and/or visual prompts to the user 108.

Once the connection is established, the server 105 is configured to receive a given game characteristic 107 from the mobile wireless communications device 102. In particular, the given game characteristic 107 comprises one or more of a selected bowling bowl animation from the plurality of bowling bowl animations, and a selected bowling lane background from the plurality of bowling lane backgrounds on the first and second bowling lanes 101a-101b. The plurality of bowling lane backgrounds may comprise live bowling lane backgrounds, static bowling lane backgrounds, and user-specific bowling lane backgrounds.

The server 105 is configured to determine a tracking path 110 of the bowling ball 111 traveling on one or both of the first and second bowling lanes 101a-101b (illustrated on the second bowling lane) based upon the image data of the first and second bowling lanes via the image sensor 103. The tracking path includes a linear path of known past movement of the bowling ball 111, and may also additionally include a substantially linear (e.g. linear project path with uncertainty, such a cone prediction path) projected path of future movement. The tracking path may also include a speed of the bowling ball 111, an angular speed of the bowling ball, and an angular vector of the bowling ball.

As will be appreciated, the plurality of light sources 113a-113d is configured to aid/enhance tracking of the bowling ball 111. In some embodiments, the plurality of light sources 113a-113d may be omitted.

The server 105 is configured to selectively change the set of projected images 112a-112f based upon the tracking path 110 of the bowling ball 111 and the given game characteristic. For example, if the selected bowling bowl animation comprises a fire trail animation, the tracking path 110 would include path of fire included in the set of projected images 112a-112f. In some embodiments, the server 105 is also configured to additionally selectively change the audio output of the plurality of speakers 116a-116d and the visual output of the display 115 based upon the tracking path 110 of the bowling ball 111 and the given game characteristic.

Referring now briefly and additionally to FIGS. 10-13, an example embodiment of the user interface menu 320 is now described with reference to screenshots 60-63. In this example embodiment, the mobile wireless communications device 102 illustratively comprises a touchscreen display interface. Of course, in other embodiments, other input interfaces could be used, such as a mechanical button interface.

Figure 10:
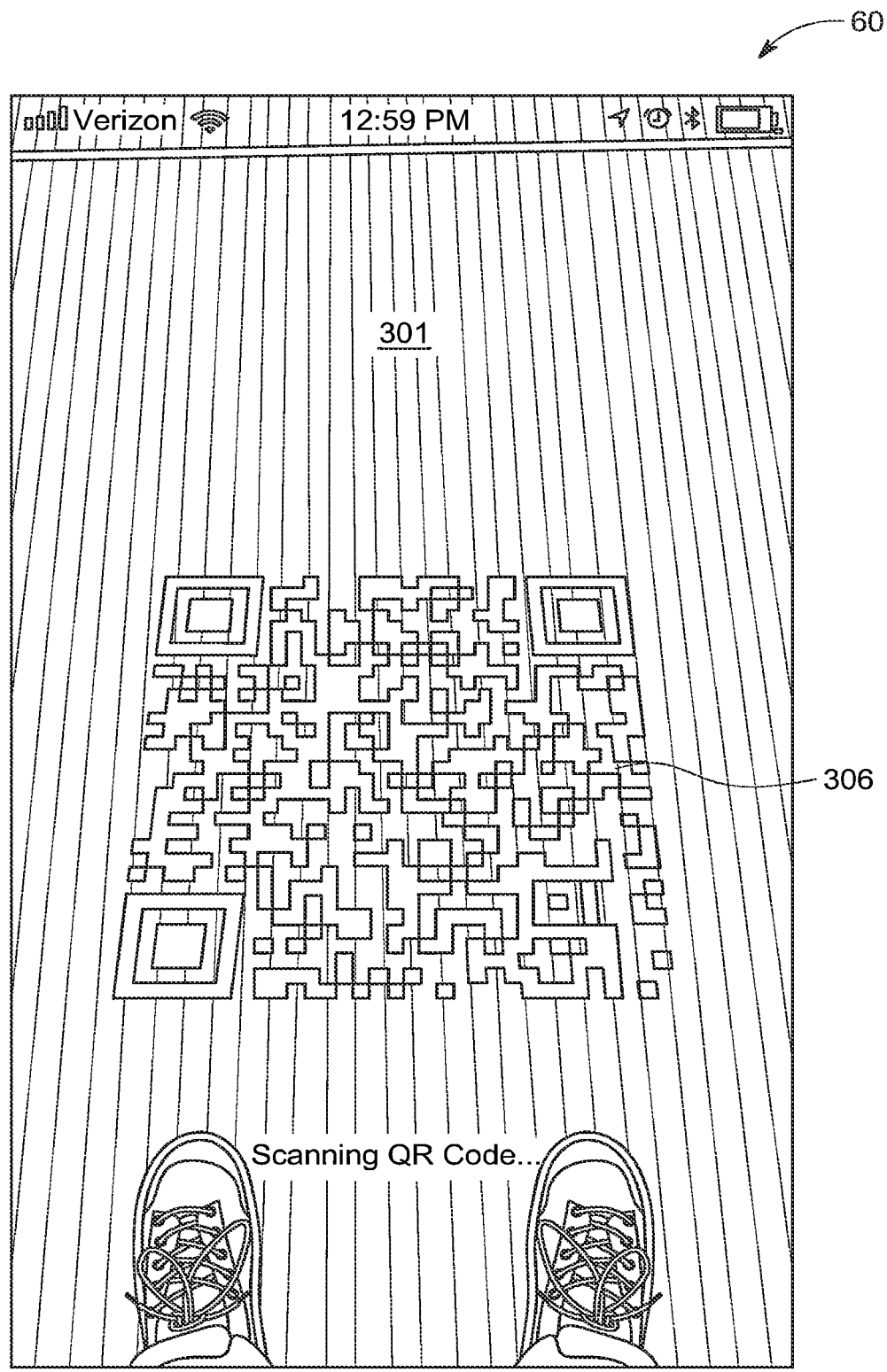
FIGS. 10-13 are screenshots of a user interface menu for the mobile wireless communication in an example embodiment of the bowling enhancement system, according to the present disclosure.

In FIG. 10, the pairing token 306 comprises a QR code generated by the given projector 104a adjacent a foul line of the bowling lane 301. The mobile wireless communications device 102 ingests the pairing token 306 via the onboard image sensor 114 and passes the pairing token to the server 105.

Figure 11:
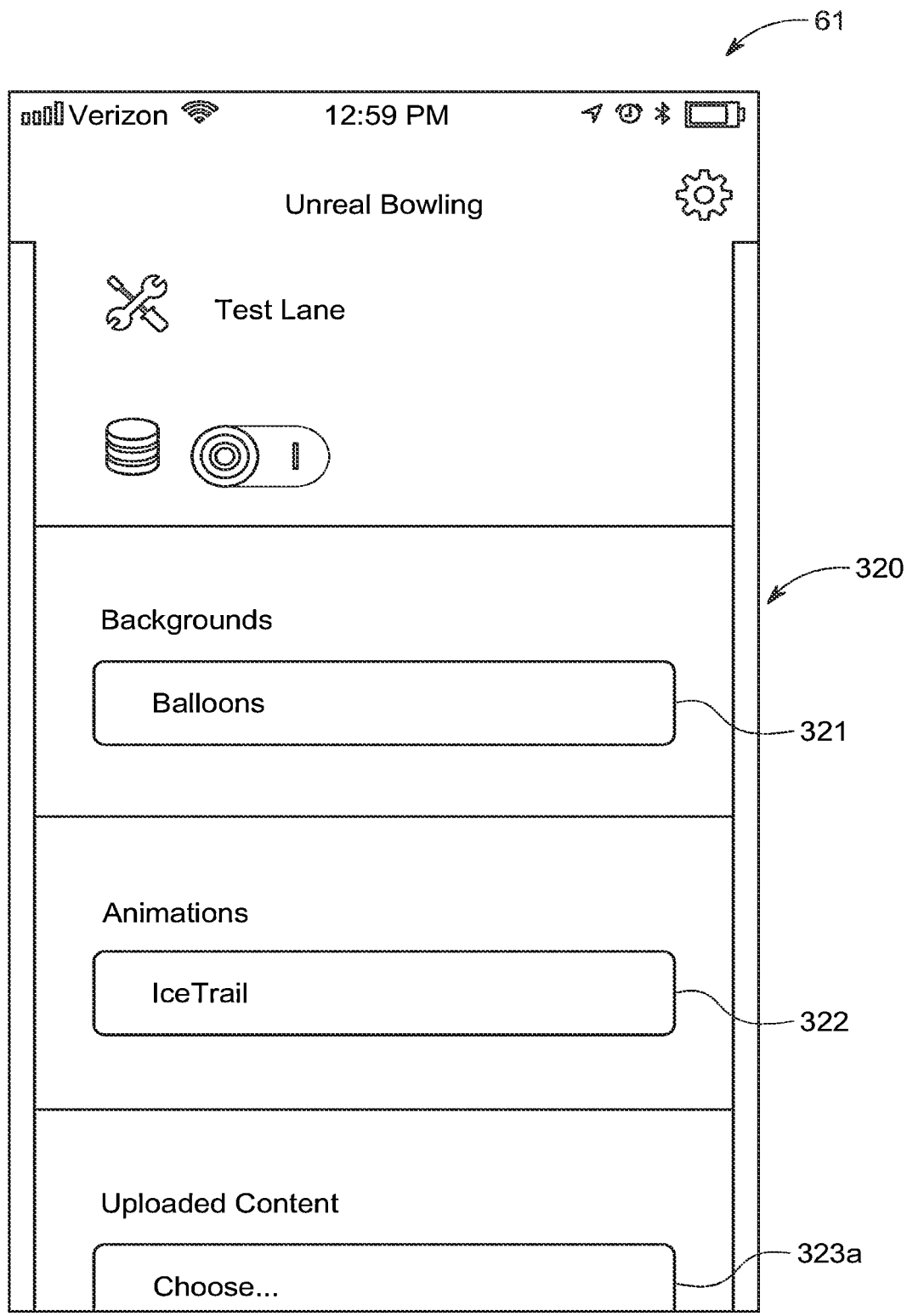
Figure 12:
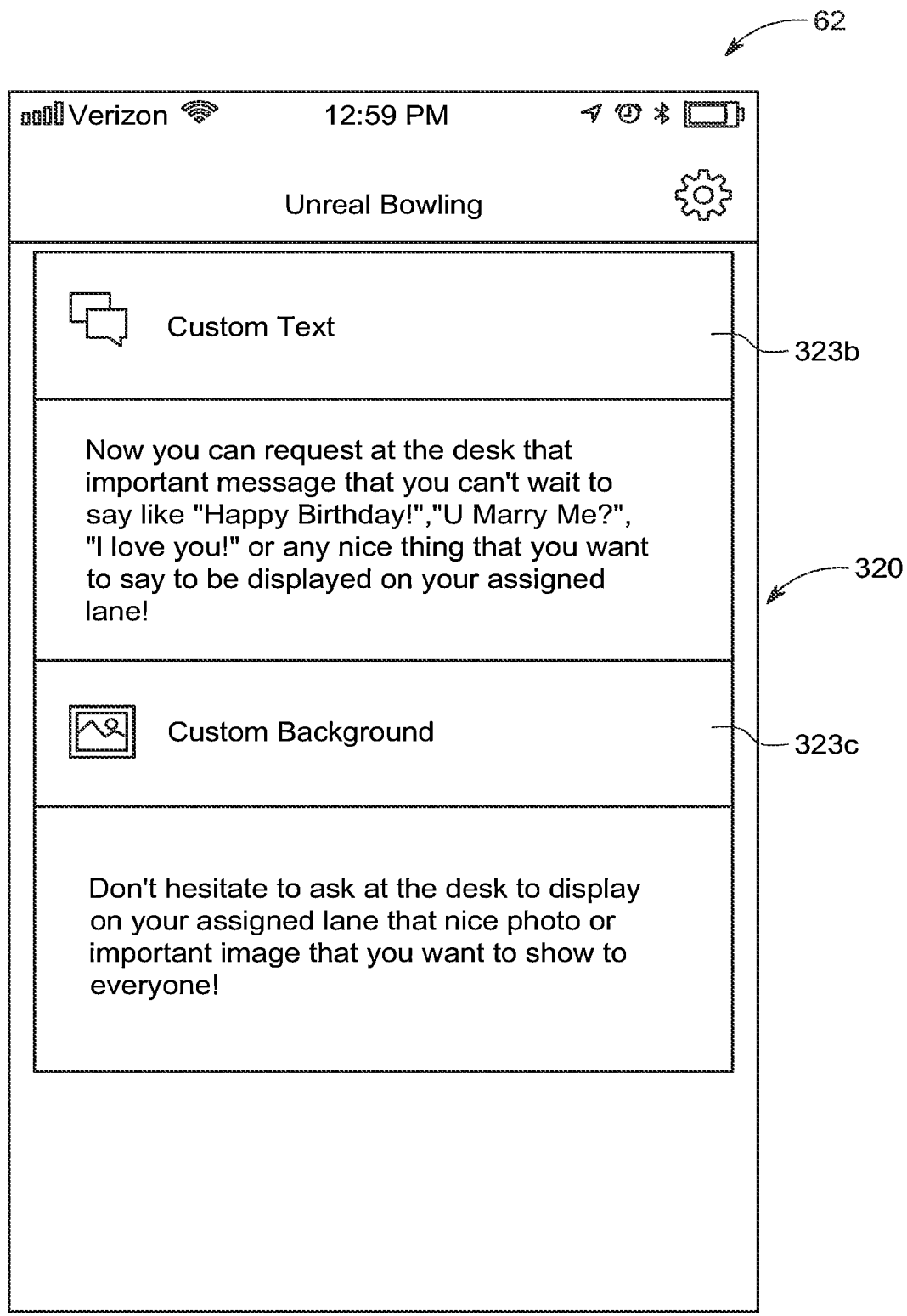

In FIG. 11, once the communication link is established between the mobile wireless communications device 102 and the server 105, the mobile wireless communications device is configured to display the user interface menu 320, which includes first and second fly down menus 321, 322 for selecting a plurality of bowling bowl animations, and a plurality of bowling lane backgrounds. The mobile wireless communications device 102 is configured to receive a selected game characteristic via selection by the user 108 on the user interface menu 320. The selected game characteristic defines the given game characteristic, which is transmitted to the server 105. The user interface menu 320 illustratively comprises a fly down menu 323a for uploading user specific content. In other words, the user 108 may choose and upload content for inclusion in the set of projected images 112a-112f. In FIG. 12, the user interface menu 320 illustratively comprises a menu 323b for uploading a custom text message for display in the set of projected images 112a-112f, and a menu 323c for uploading a custom background image for inclusion in the set of projected images.

Figure 13:
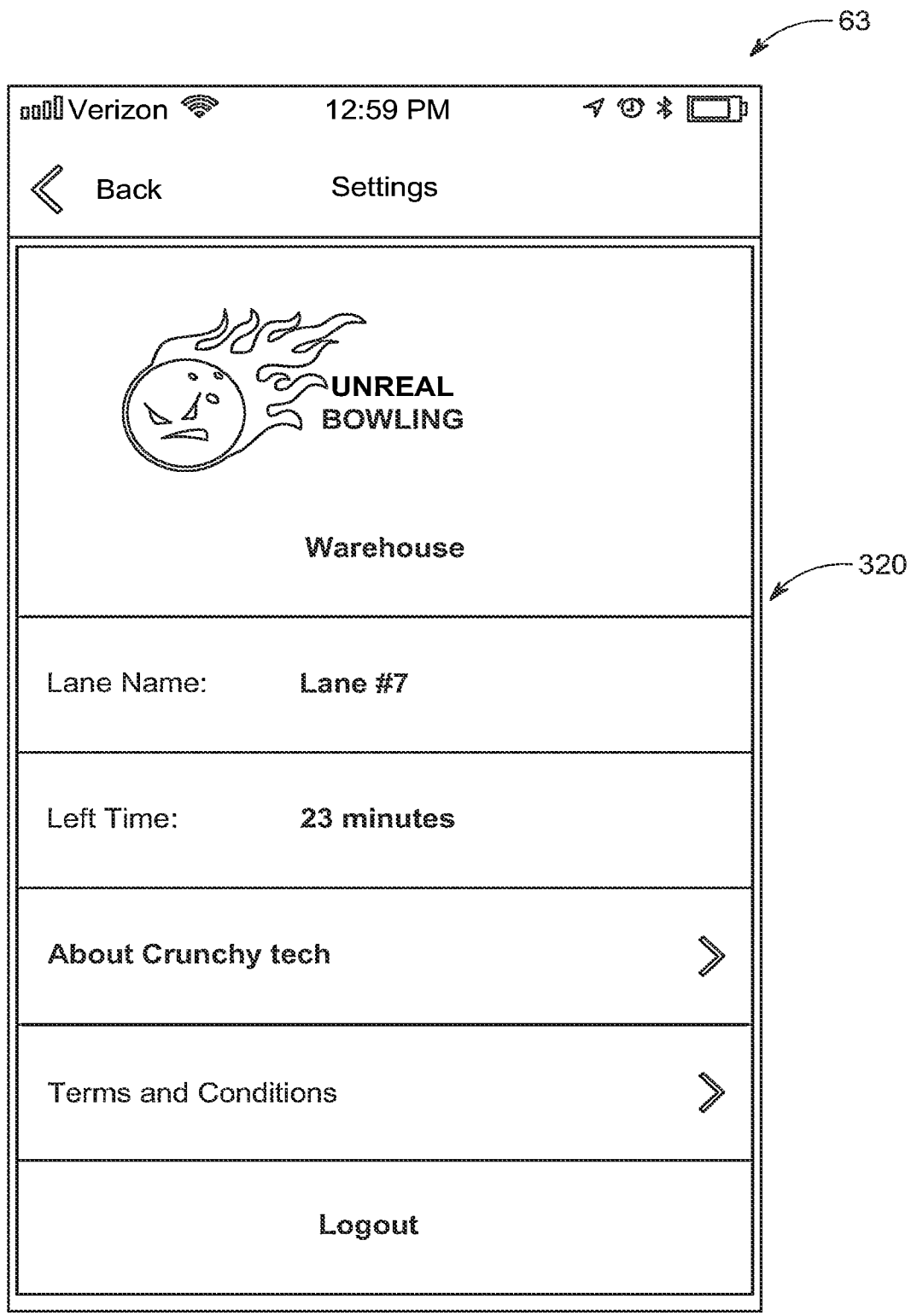
Figure 14:
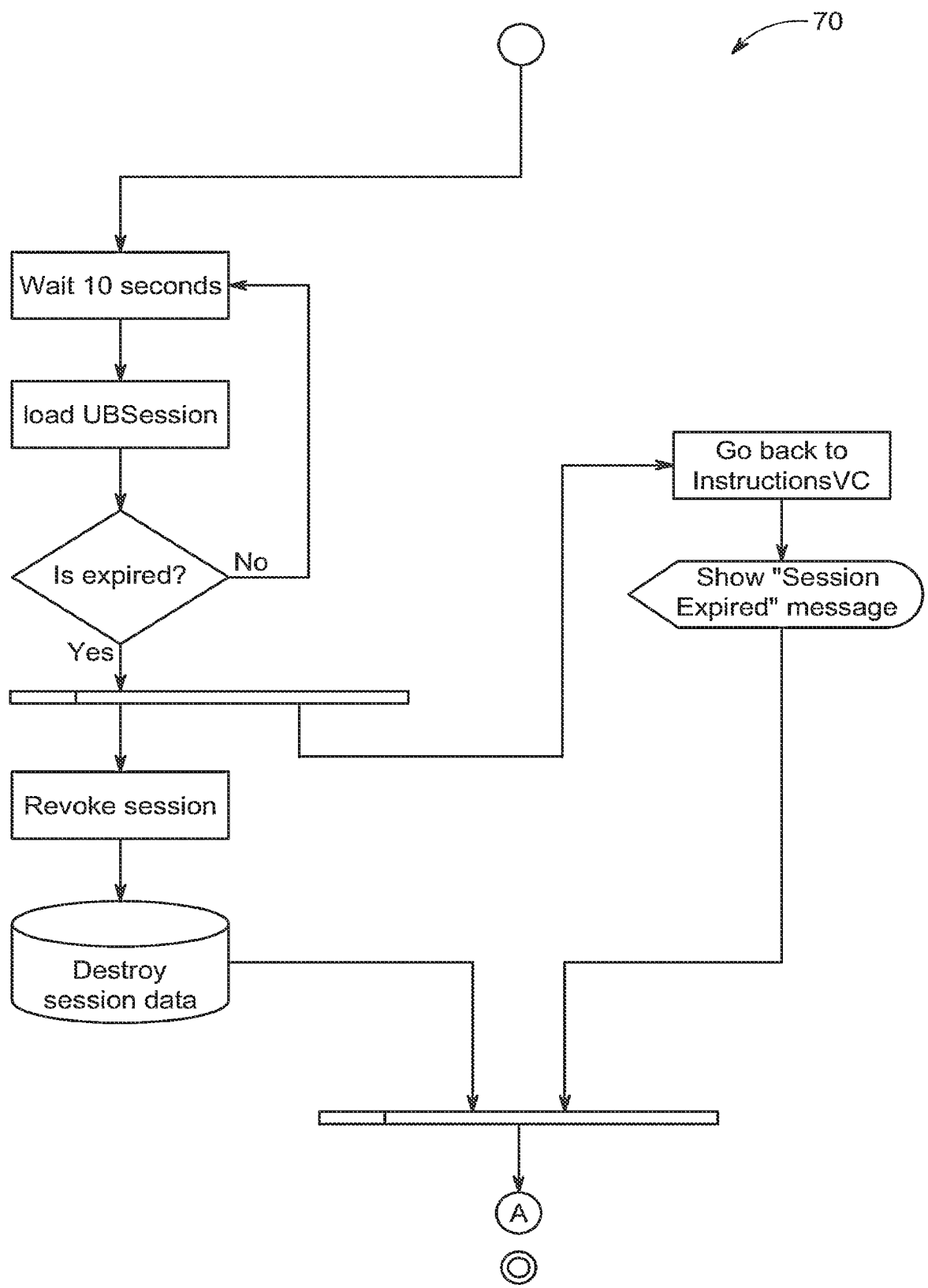
FIGS. 14-18 are flowcharts of operation in an example embodiment of the bowling enhancement system, according to the present disclosure.
Figure 15:
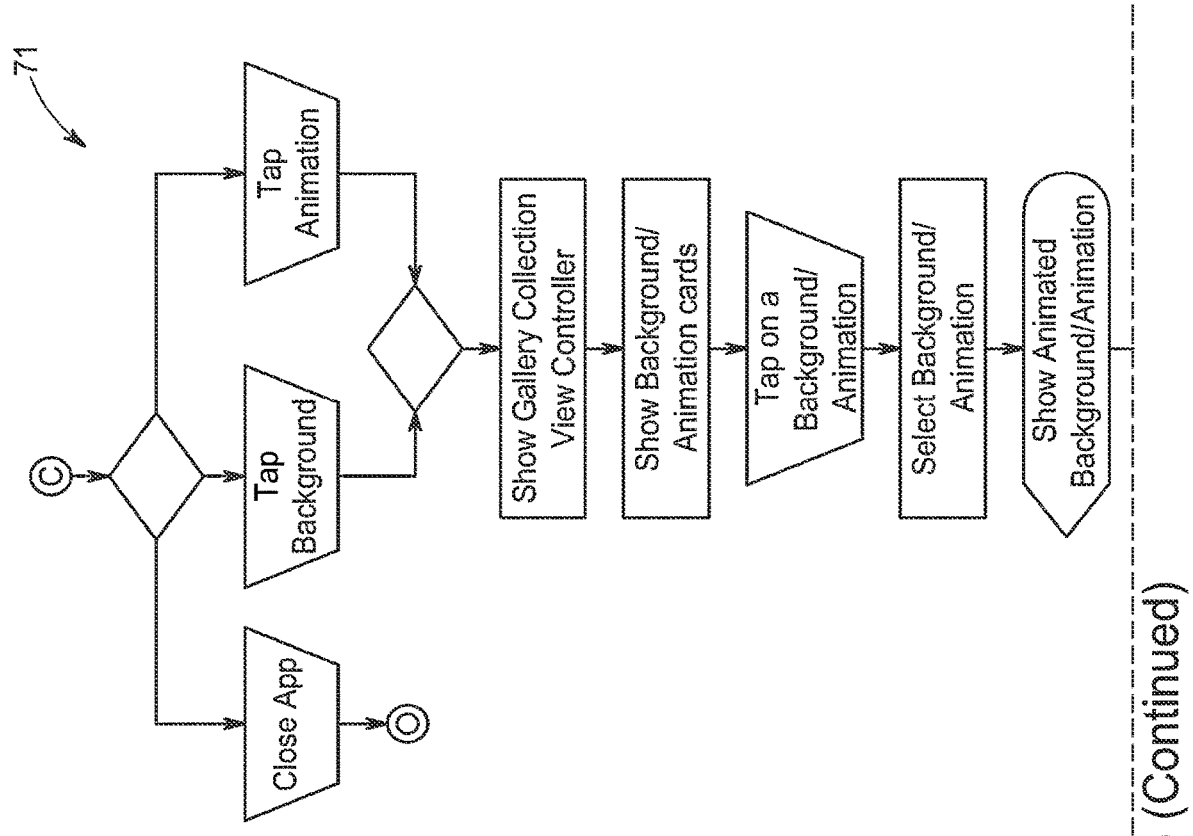
Figure 15:
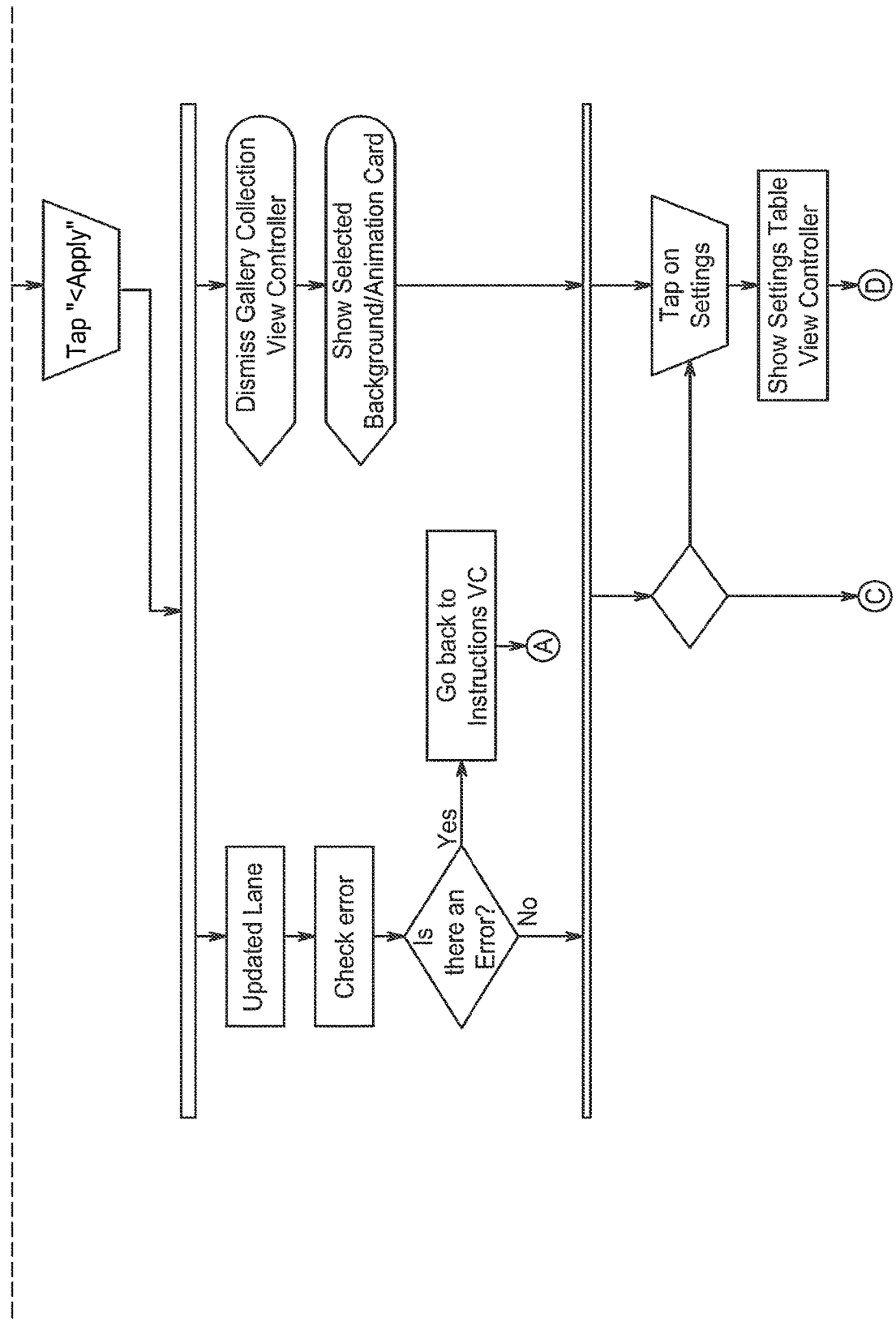
Figure 16:
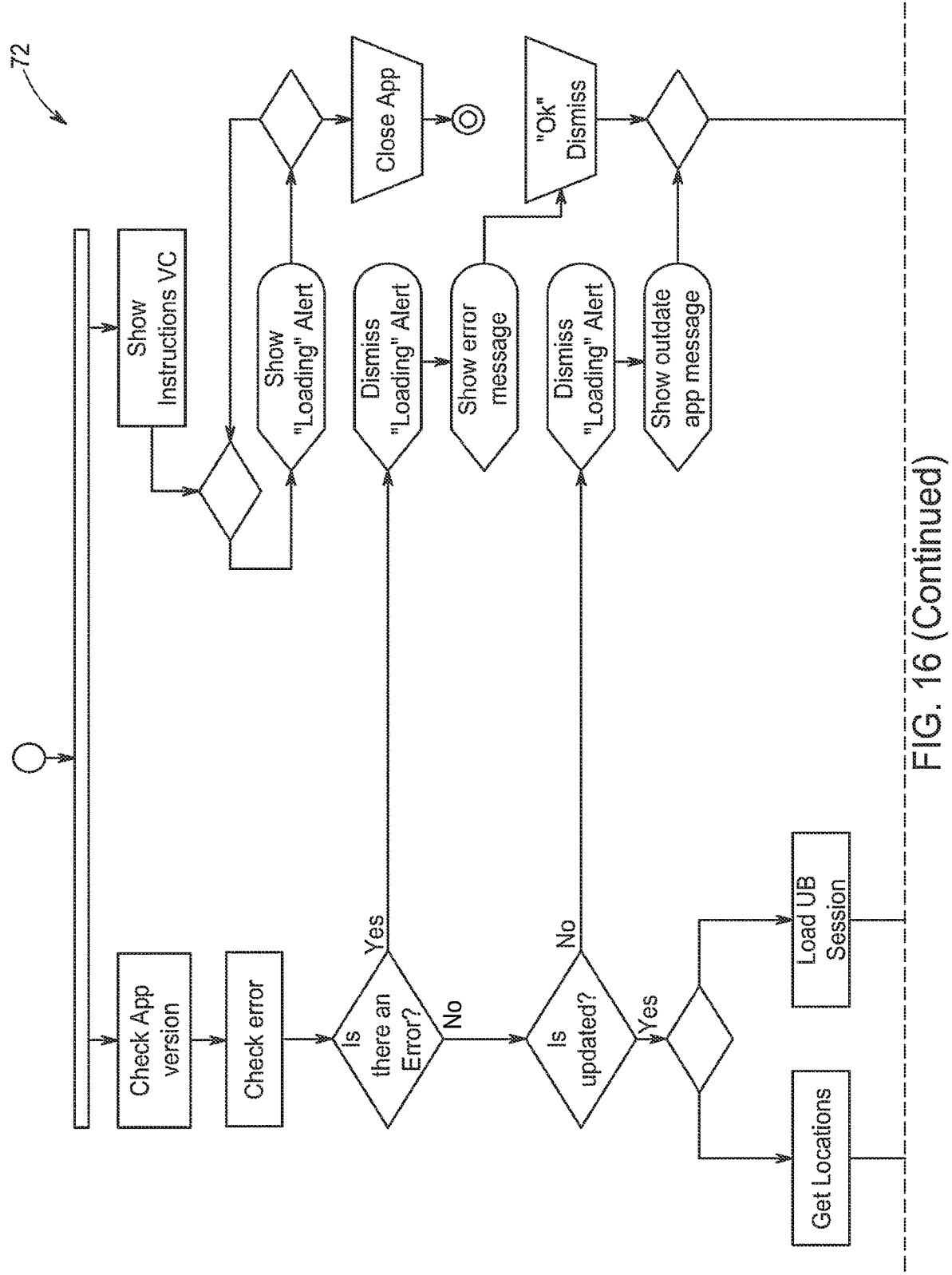
Figure 16:
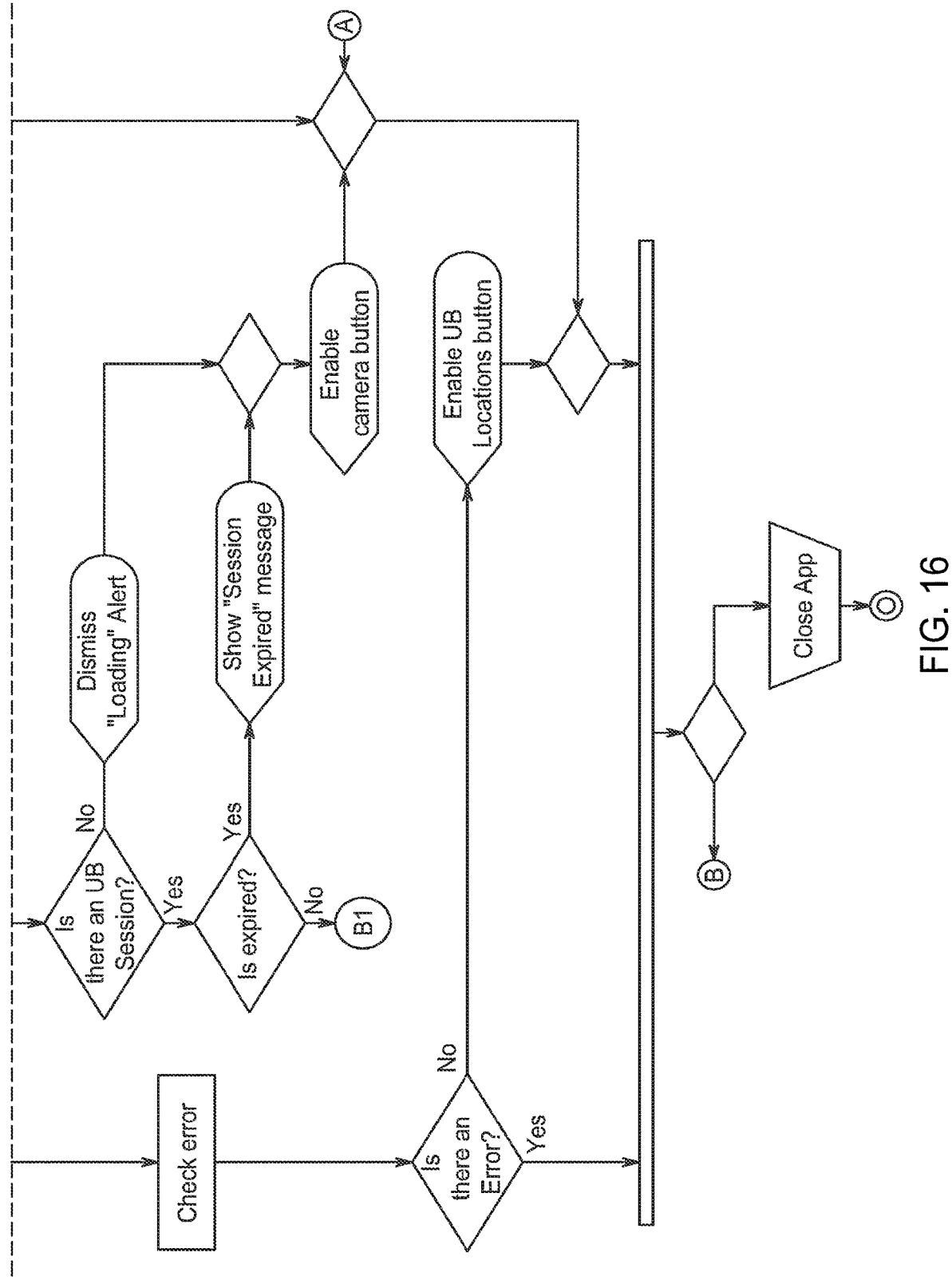
Figure 17:
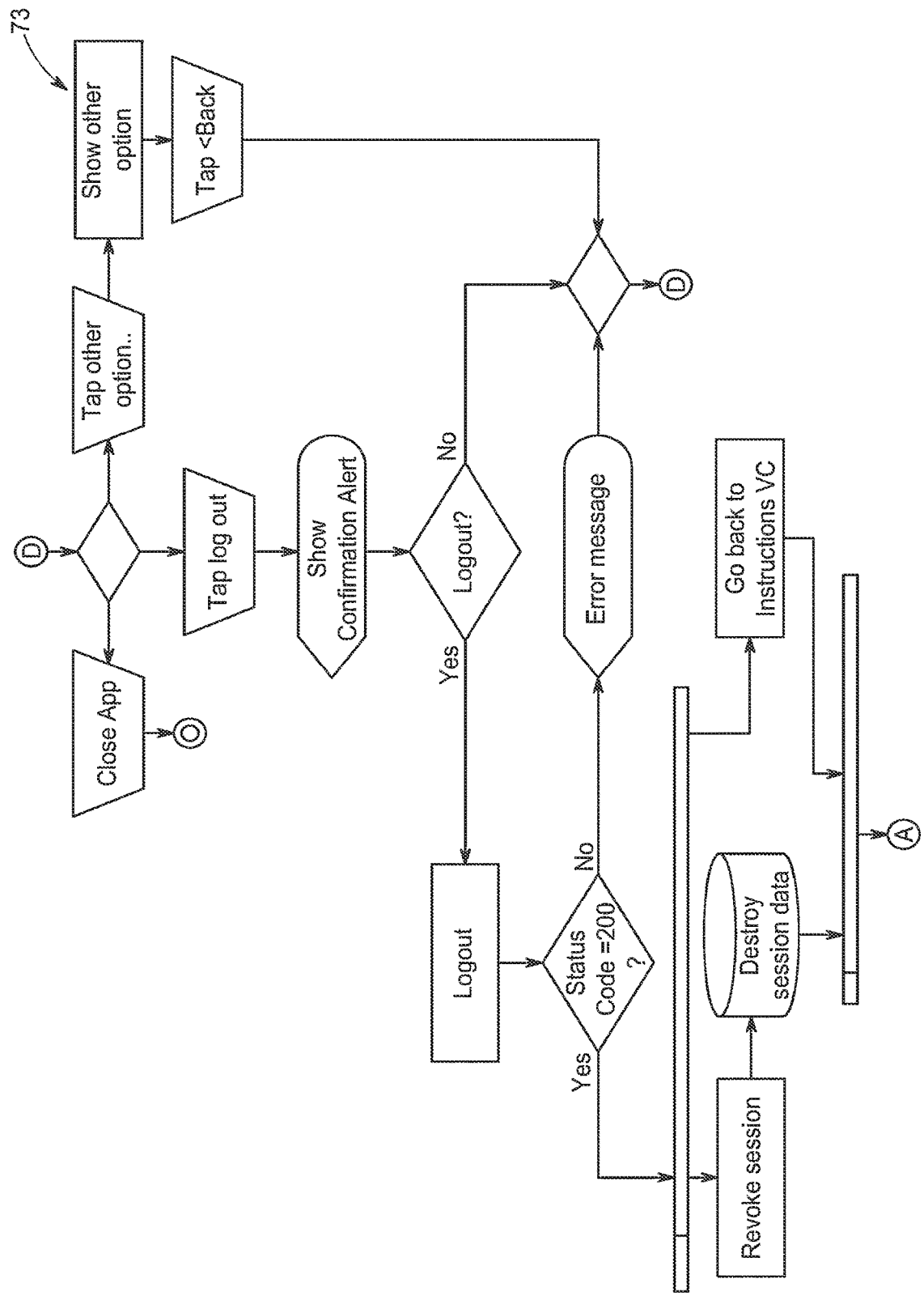
Figure 18:
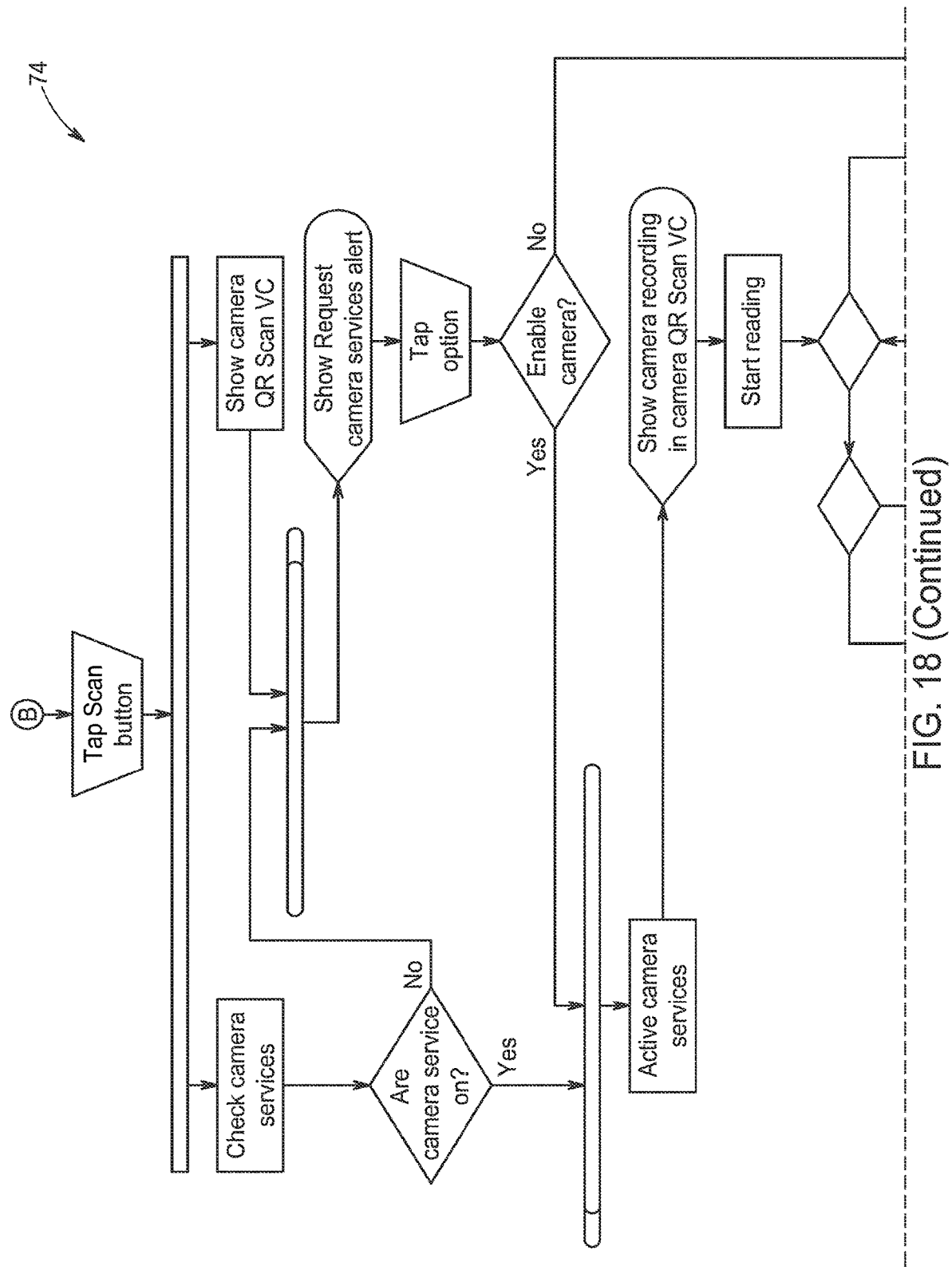
Figure 18:
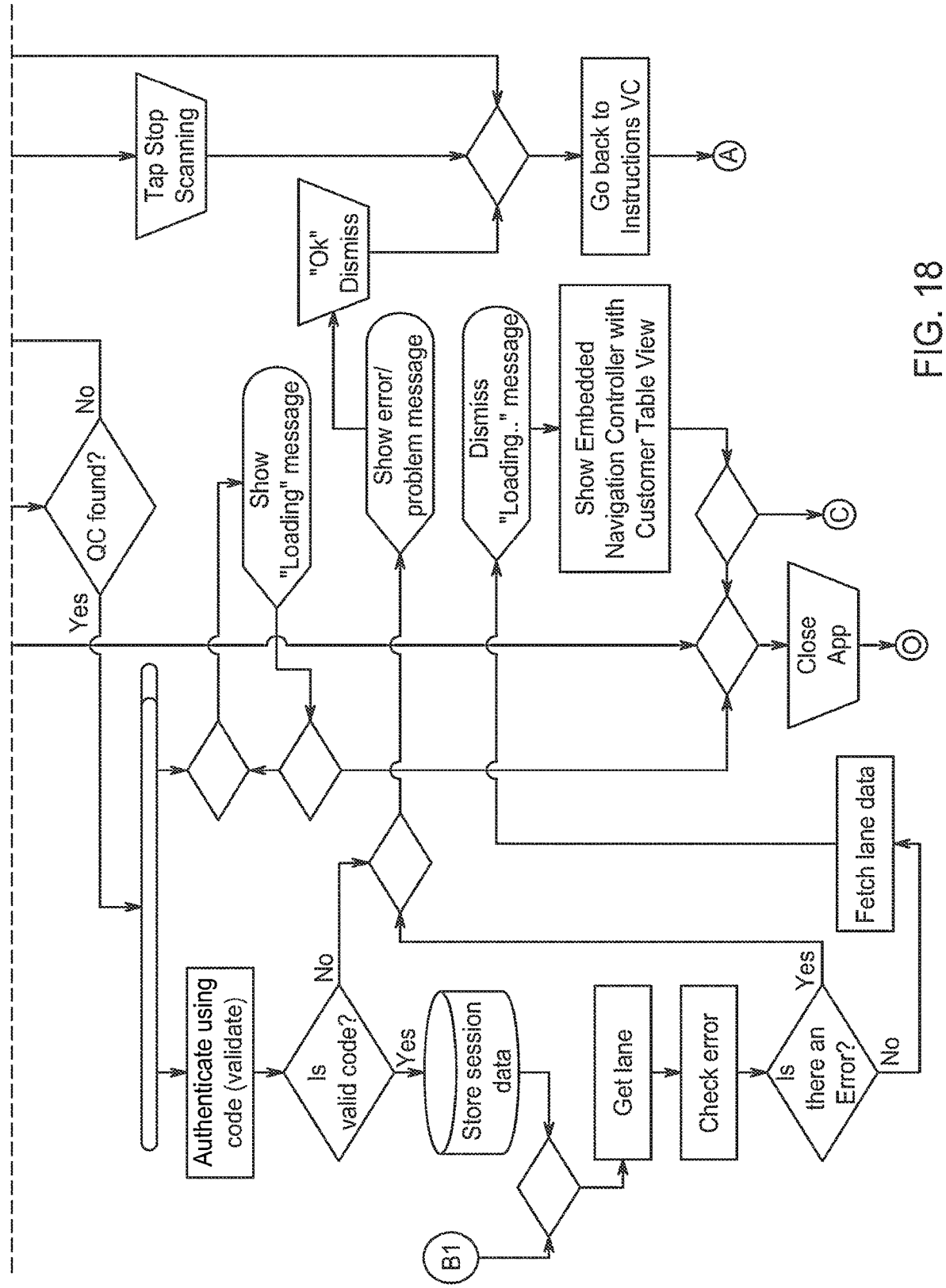

In FIG. 13, once the game characteristics have been selected and transmitted to the server 105, the bowling game commences. At this point, the user interface menu 320 transitions to an in-progress state, showing the lane number, and time left value. In some embodiments, the user interface menu 320 may comprise a current score for the bowling game.

In some embodiments, the mobile wireless communications device 102 is configured to present the user interface menu 320 via a native software application. In other embodiments, the mobile wireless communications device 102 is configured to present the user interface menu 320 via a web browser interface, which could be provided by the server 105.

Referring again to FIG. 1, the plurality of projectors 104a-104c are arranged over the first and second bowling lanes 101a-101b and configured to generate a plurality of sets 112a-112c & 112d-112f of projected images onto the plurality of bowling lanes. In other words, a single projector from the plurality of projectors 104a-104c is configured to cover two bowling lanes illustratively. In other embodiments, the single projector from the plurality of projectors 104a-104c is configured to cover four of more bowling lanes with appropriate vertical placement and/or use of appropriate lens (e.g. a wide fixed focal length projector lens (i.e. a wide throw lens)). As will be appreciated, the server 105 is configured to segment the plurality of sets 112a-112c & 112d-112f of projected images into the corresponding number of sets for the needed number of bowling lanes. Of course, the single projector from the plurality of projectors 104a-104c may also be configured to cover a single bowling lane in simpler applications.

Another aspect is directed to a method for operating a bowling enhancement system 100 for first and second bowling lanes 101a-101b. The method includes operating at least one image sensor 103 arranged over the first and second bowling lanes 101a-101b to generate image data of the first and second bowling lanes, and operating a plurality of projectors 104a-104c arranged over the first and second bowling lanes to generate a set of projected images 112a-112f onto the first and second bowling lanes. The method comprises operating a server 105 coupled to the at least one image sensor 103 and the plurality of projectors 104a-104c. The server 105 is for causing a given projector 104a to project a pairing token 103a-103b onto the first and second bowling lanes 101a-101b for ingestion by a mobile wireless communications device 102, and when receiving the pairing token from the mobile wireless communications device, establishing a communication link with the mobile wireless communications device to receive a given game characteristic from the mobile wireless communications device. The server 105 is also for determining a tracking path 110 of a bowling ball 111 traveling on the first and second bowling lanes 101a-101b based upon the image data of the first and second bowling lanes, and selectively changing the set of projected images 112a-112f based upon the tracking path of the bowling ball and the given game characteristic.

Referring now to FIGS. 2-8, another embodiment of the bowling enhancement system 200 is now described. In this embodiment of the bowling enhancement system 200, those elements already discussed above with respect to FIG. 1 are incremented by 100 and most require no further discussion herein. This embodiment differs from the previous embodiment in that this bowling enhancement system 200 illustratively includes the server comprising a cloud platform 205a, and a local server 205b cooperating with the cloud platform. The bowling enhancement system 200 also illustratively includes an administrative computing device 217 coupled to the local server 205b.

Figure 2:
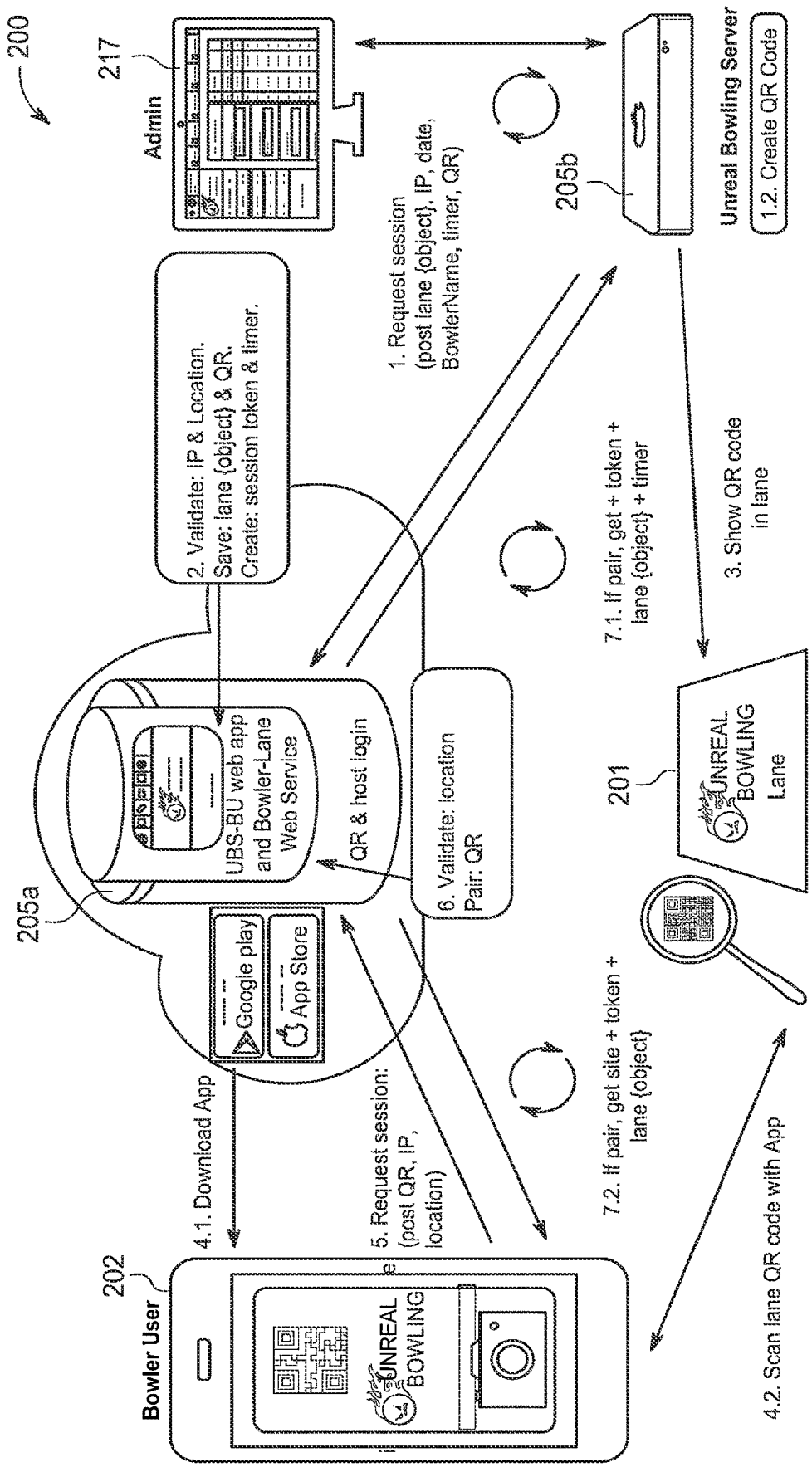
FIGS. 2-8 are diagrams of communication flow in an example embodiment of the bowling enhancement system, according to the present disclosure.
Figure 3:
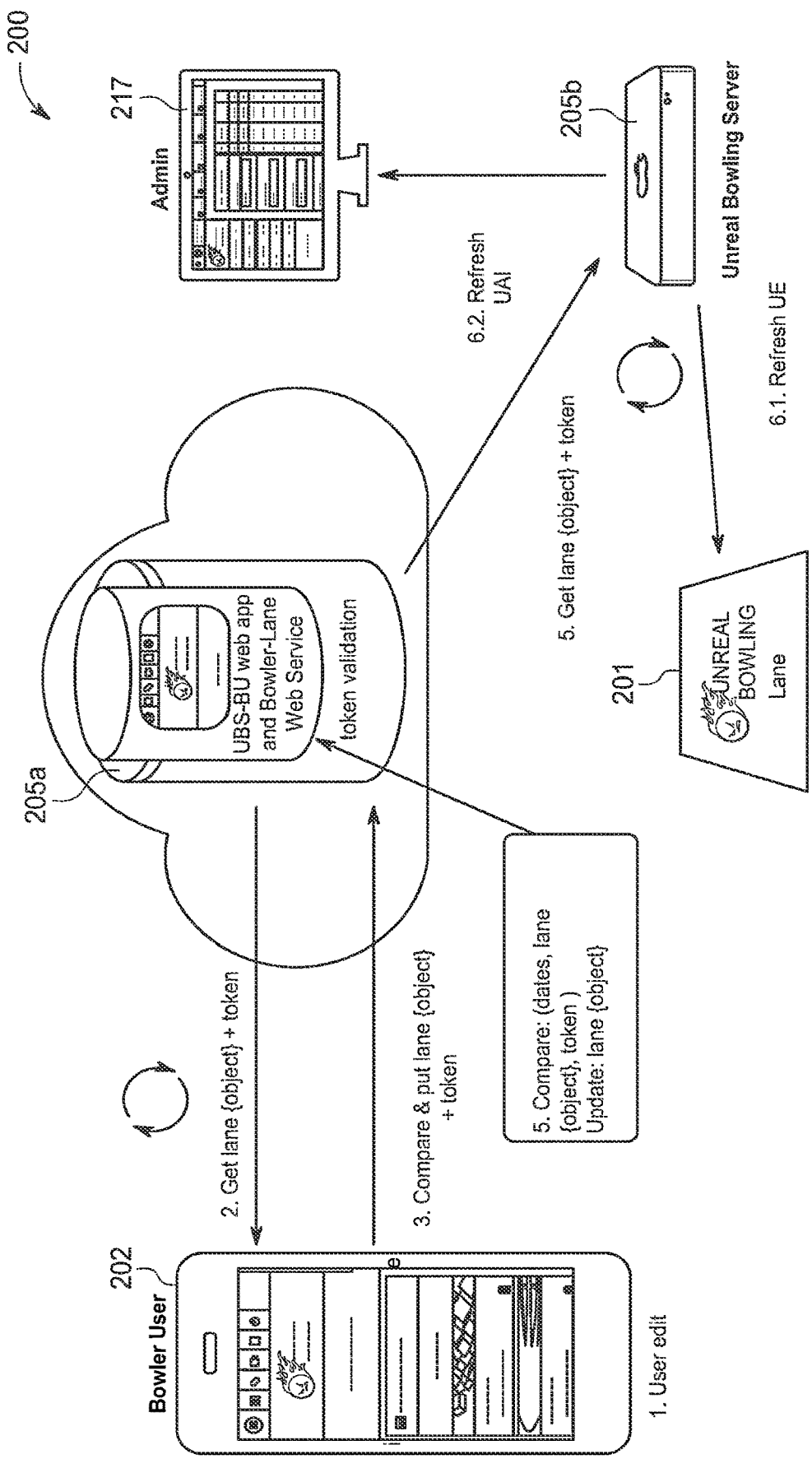
Figure 4:
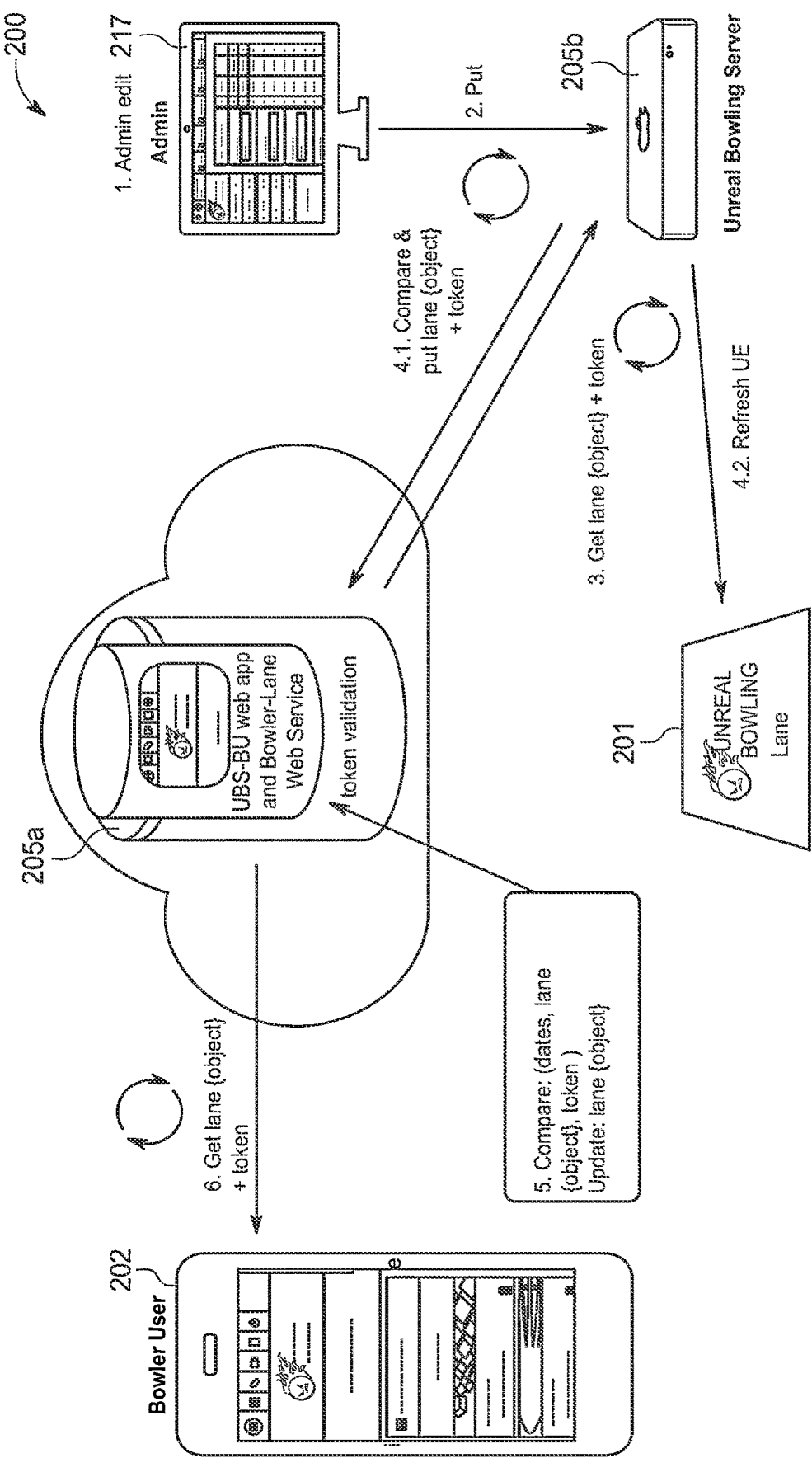
Figure 5:
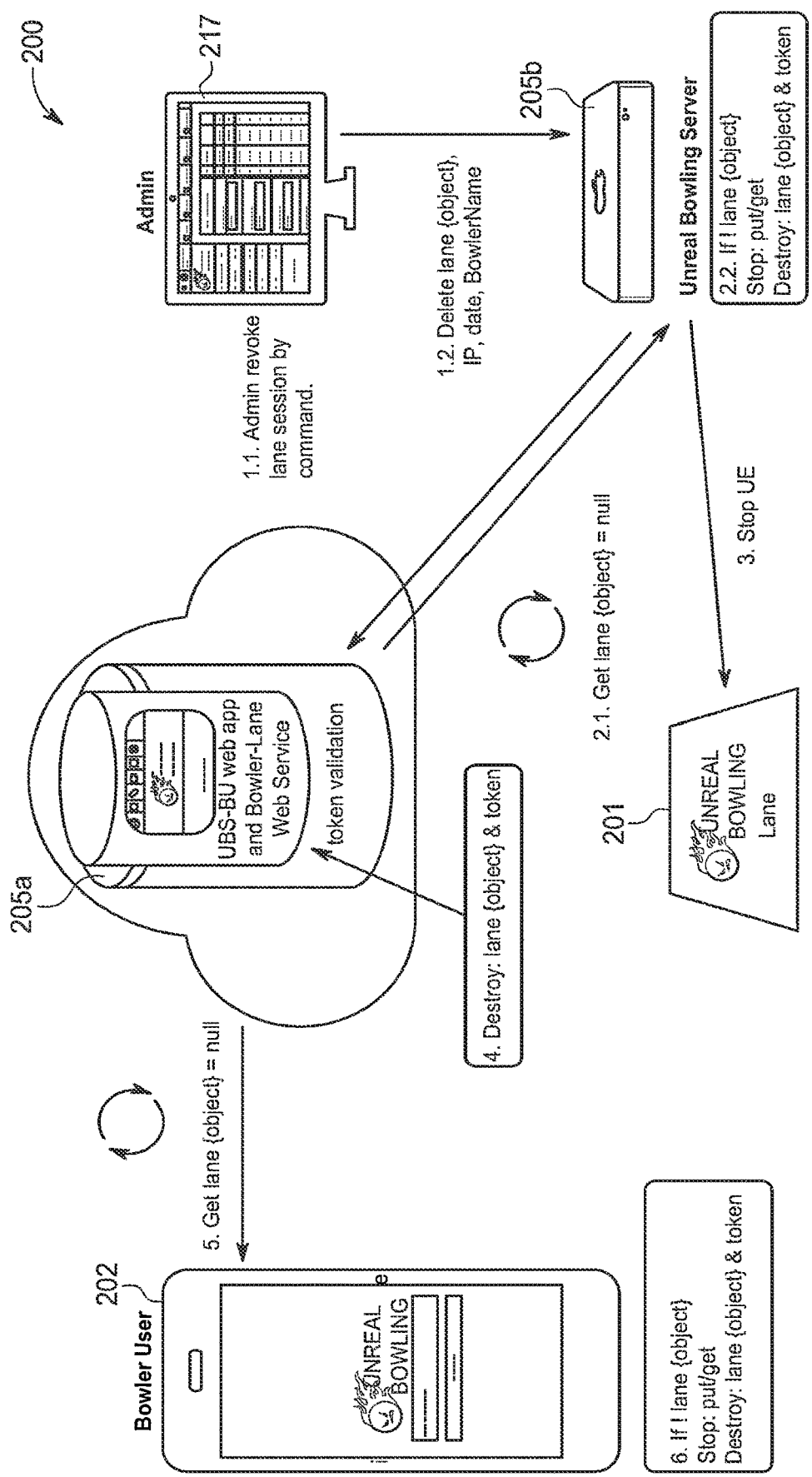
Figure 6:
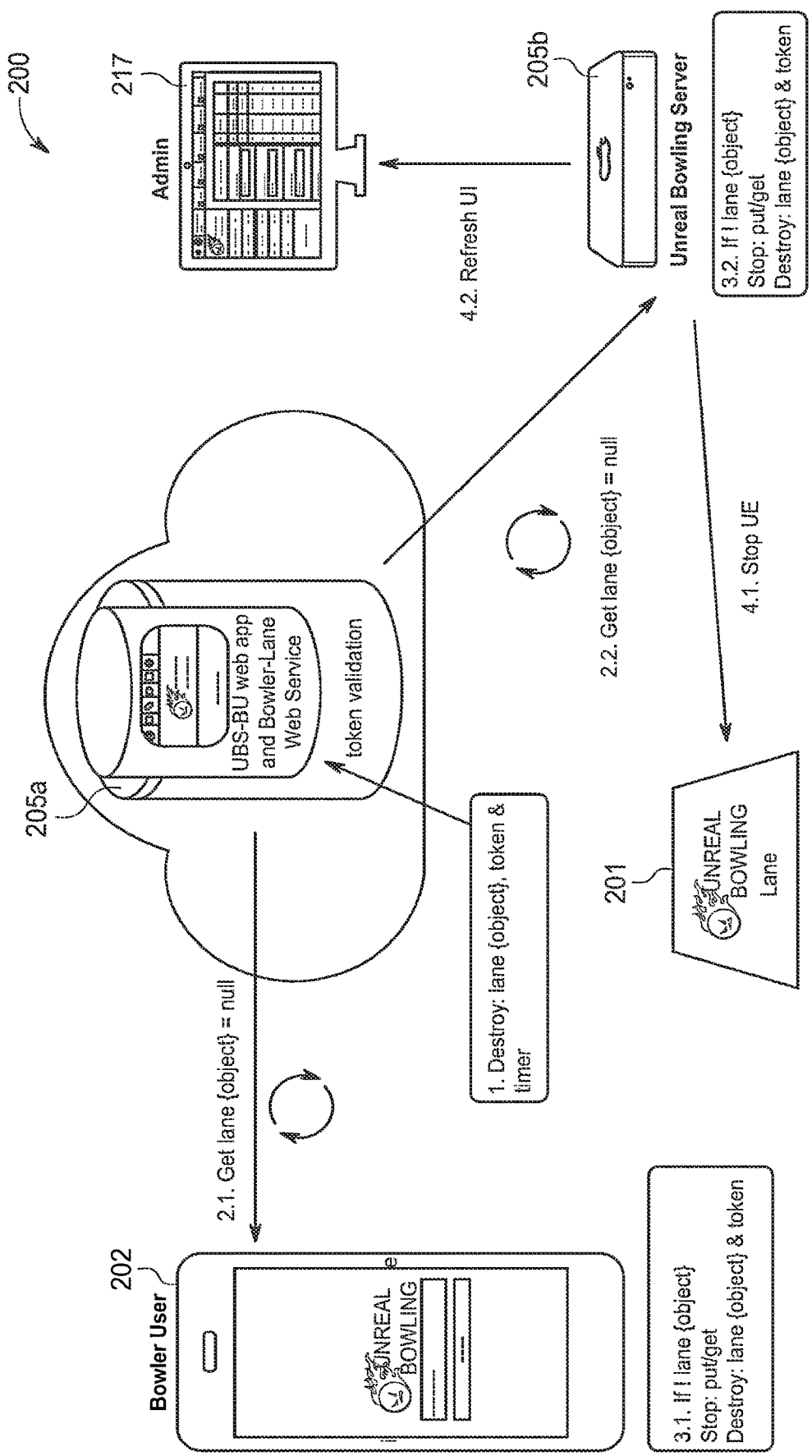
Figure 7:
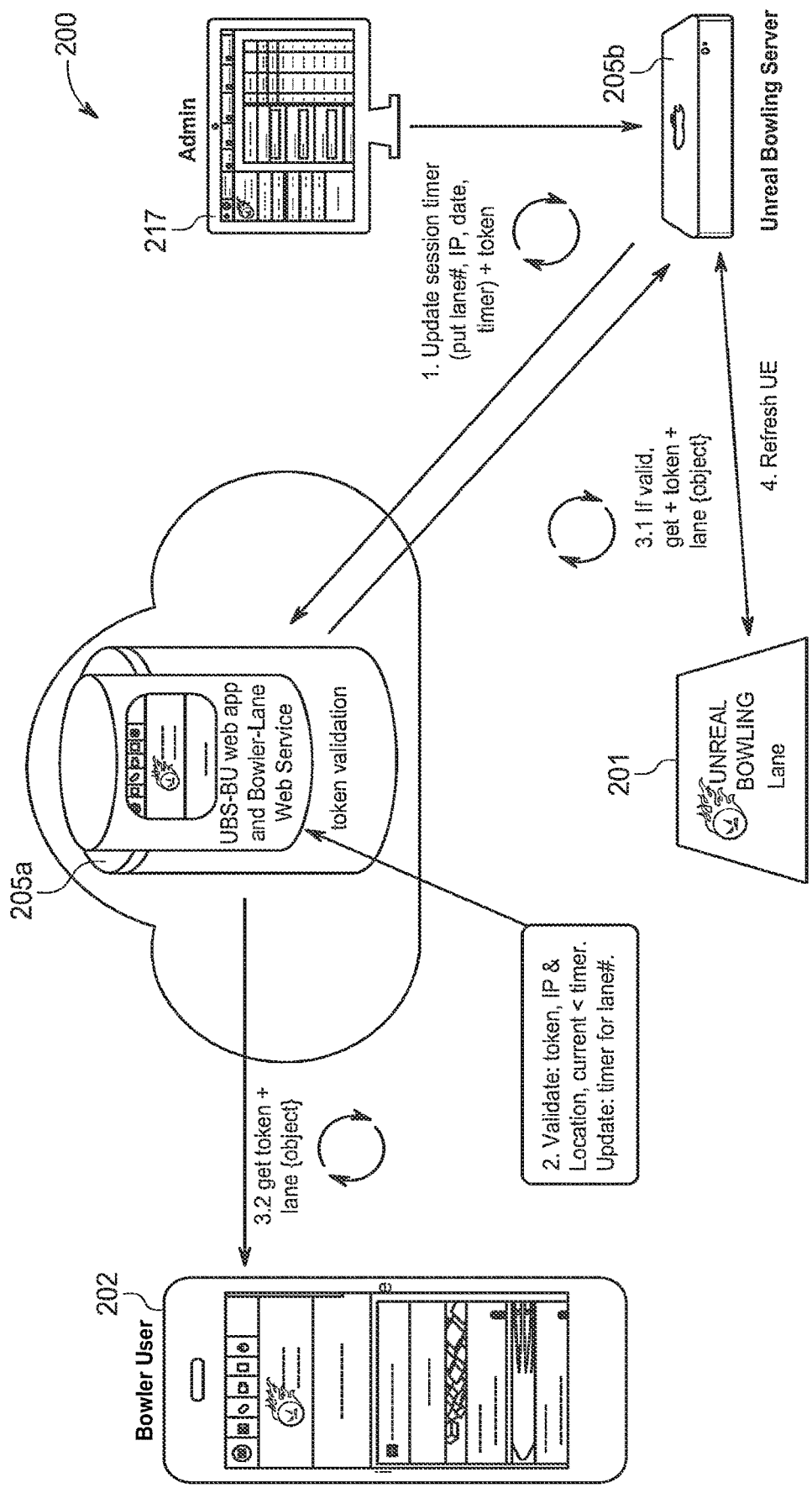
Figure 8:
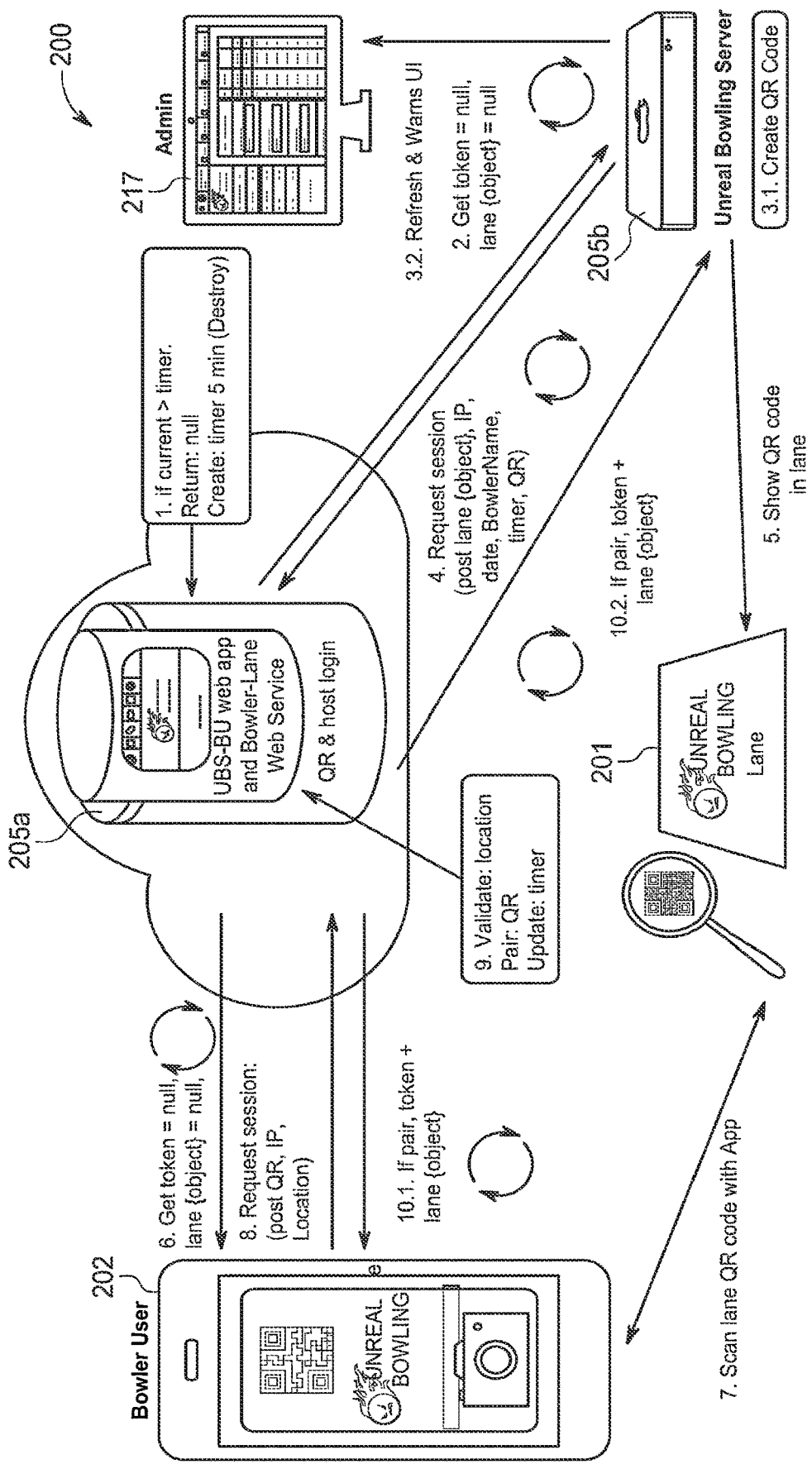

In FIG. 2, the communications during an authentication process for the bowling enhancement system 200 are shown. In FIG. 3, the communications from the mobile wireless communications device 202 for initialization of the bowling game are shown. In FIG. 4, the communications from the server 205a-205b to the mobile wireless communications device 202 are shown. In FIG. 5, the administrative computing device 217 is revoking a bowling lane from the mobile wireless communications device 202 and associated user. In FIG. 6, the cloud platform 205a is revoking a bowling lane from the mobile wireless communications device 202 and associated user. In FIG. 7, the administrative computing device 217 is updating a bowling lane for the mobile wireless communications device 202 and associated user. In FIG. 8, the cloud platform 205a is updating a bowling lane for the mobile wireless communications device 202 and associated user.

Figure 9:
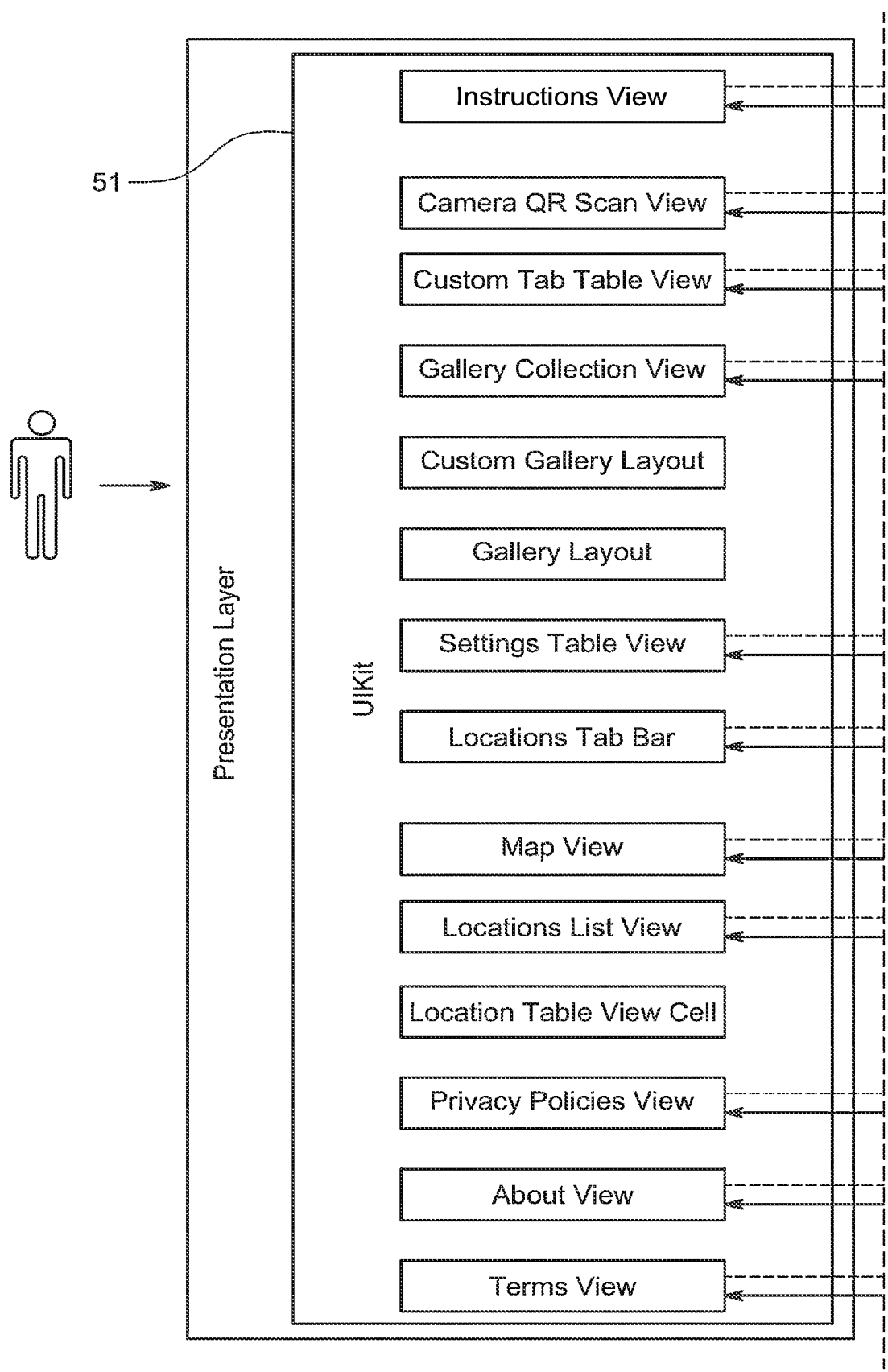
FIG. 9 is a schematic diagram of a communications stack in an example embodiment of the bowling enhancement system, according to the present disclosure.
Figure 9:
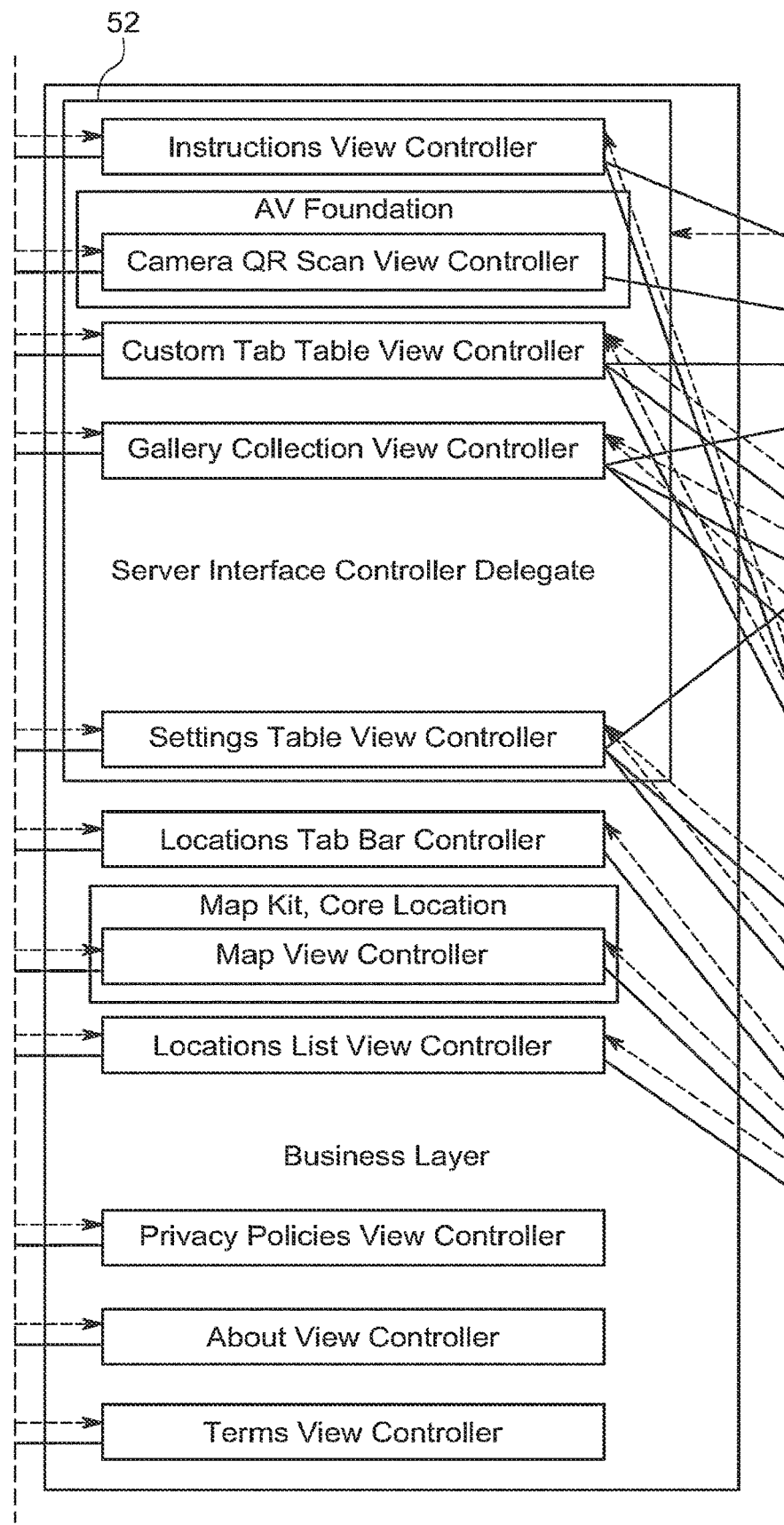
Figure 9:
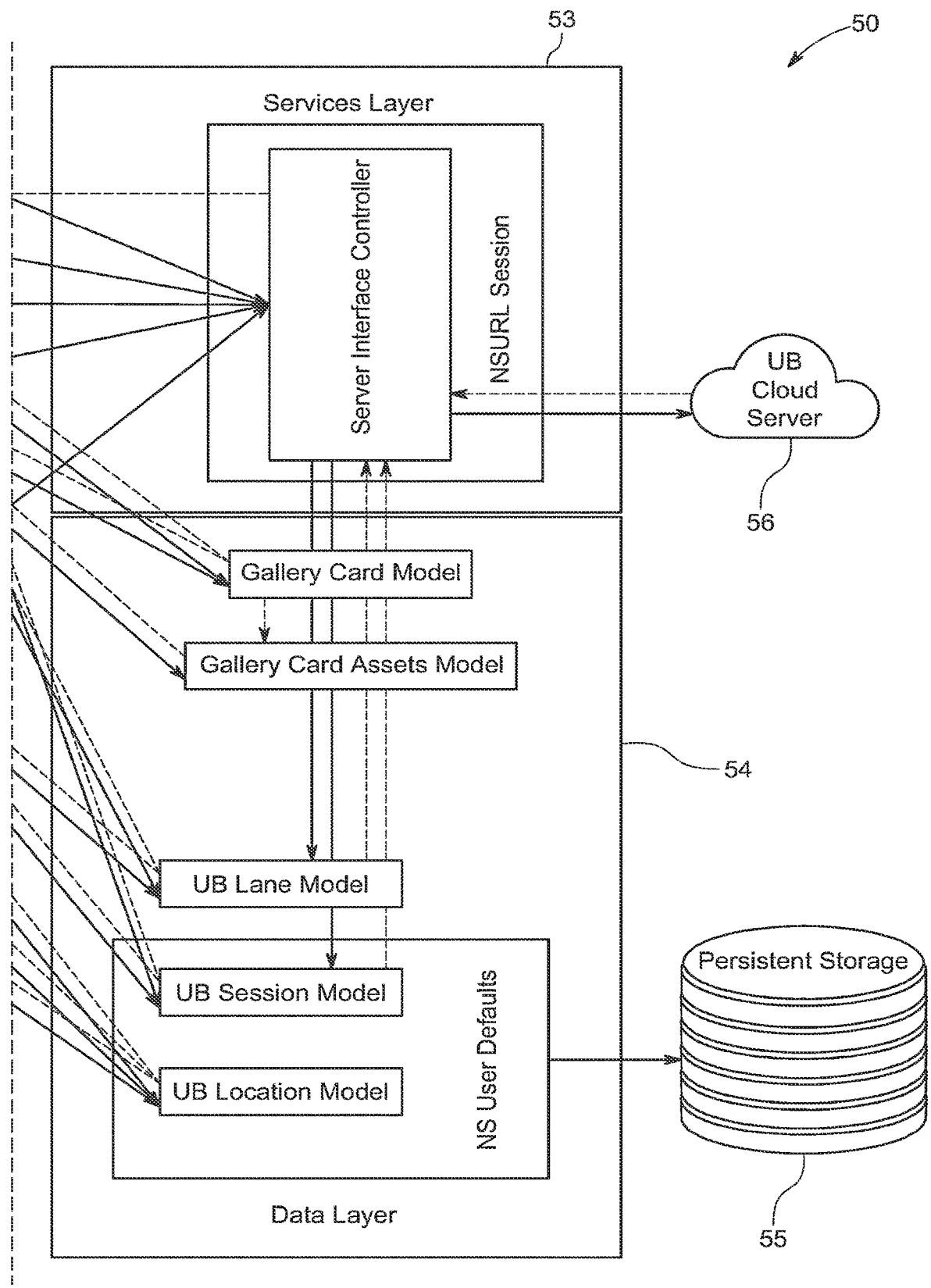

Referring now to FIG. 9, a communications stack 50 for an example embodiment of the server with the cloud platform 205a and local server 205b is now described. The communications stack 50 illustratively comprises a presentation later 51, a business layer 52 in communication with the presentation layer, a services layer 53 in communication with the business layer, and a data layer 54 in communication with the services layer and the business layer. The communications stack 50 illustratively includes a storage 55 coupled to the data layer 54, and a conduit 56 coupled between the services layer 53 and the cloud platform 205a.

Referring now to FIGS. 14-18, a flowchart 70 shows the process for when a gaming session between the server 205a-205b and the mobile wireless communications device 202 expires. A flowchart 71 shows a process of the mobile wireless communications device 202 selecting the bowling ball animation and the bowling lane background.

Another flowchart 72 shows the process for when a mobile application on the mobile wireless communications device 202 is first launched. In this embodiment, the mobile wireless communications device 202 is configured to execute a software application to present the user interface menu 320 (FIGS. 10-13). Another flowchart 73 shows the process for when the user logs out of the mobile application on the mobile wireless communications device 202, and yet another flowchart 74 shows the process at the mobile wireless communication device when the pairing token is ingested.

Figure 19A:
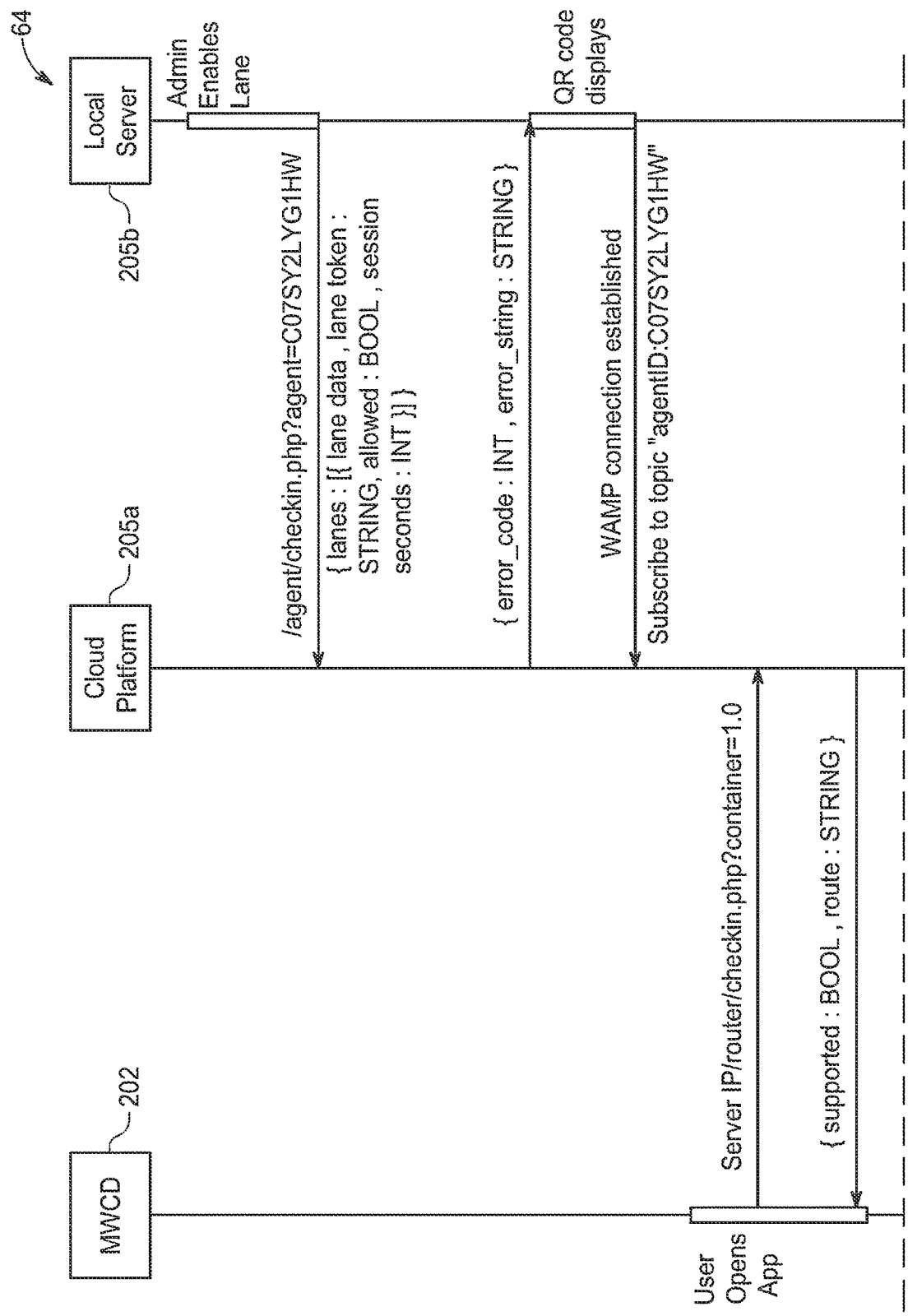
FIGS. 19A-19C are schematic diagrams of communications in an example embodiment of the bowling enhancement system, according to the present disclosure.
Figure 19A:
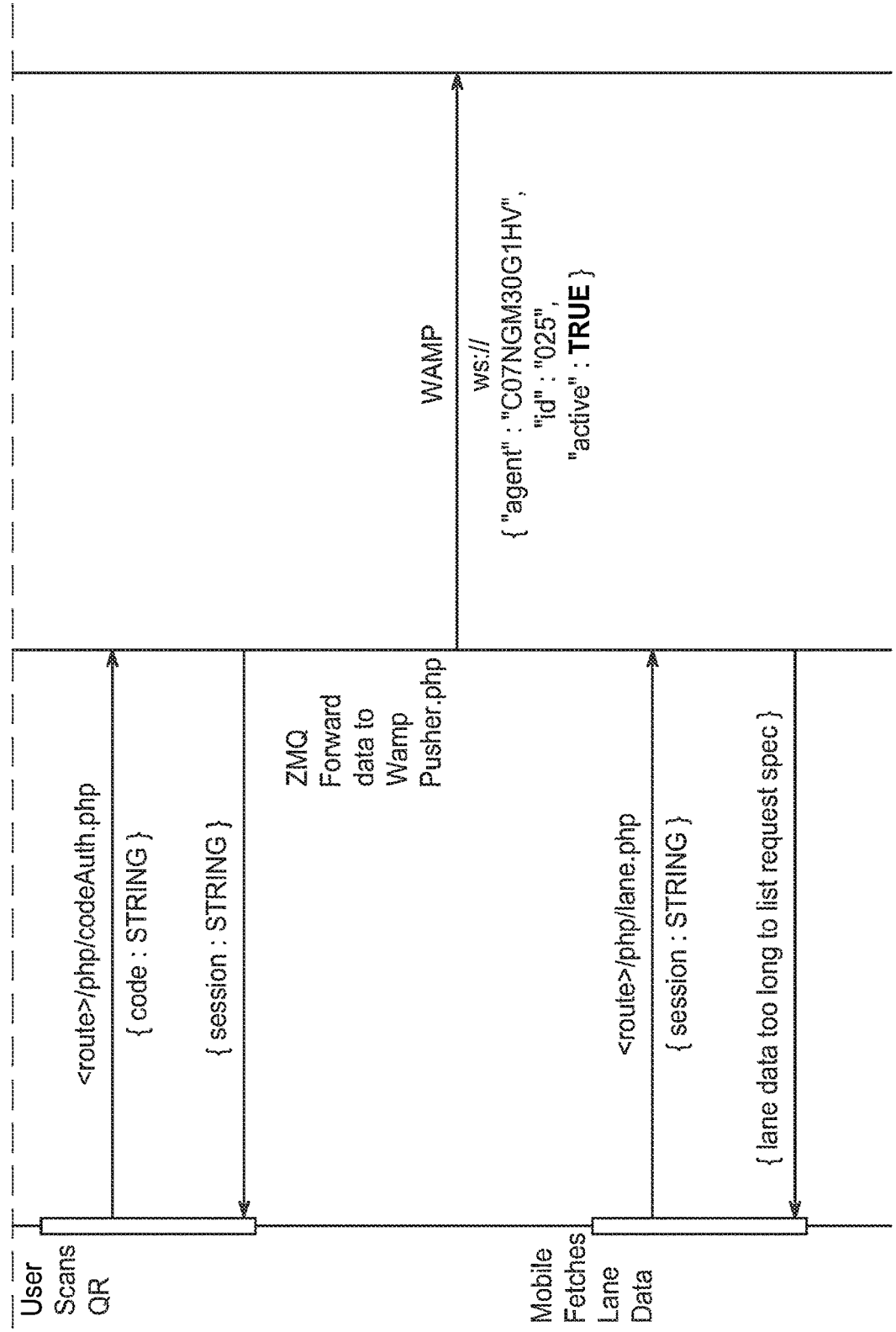
Figure 19B:
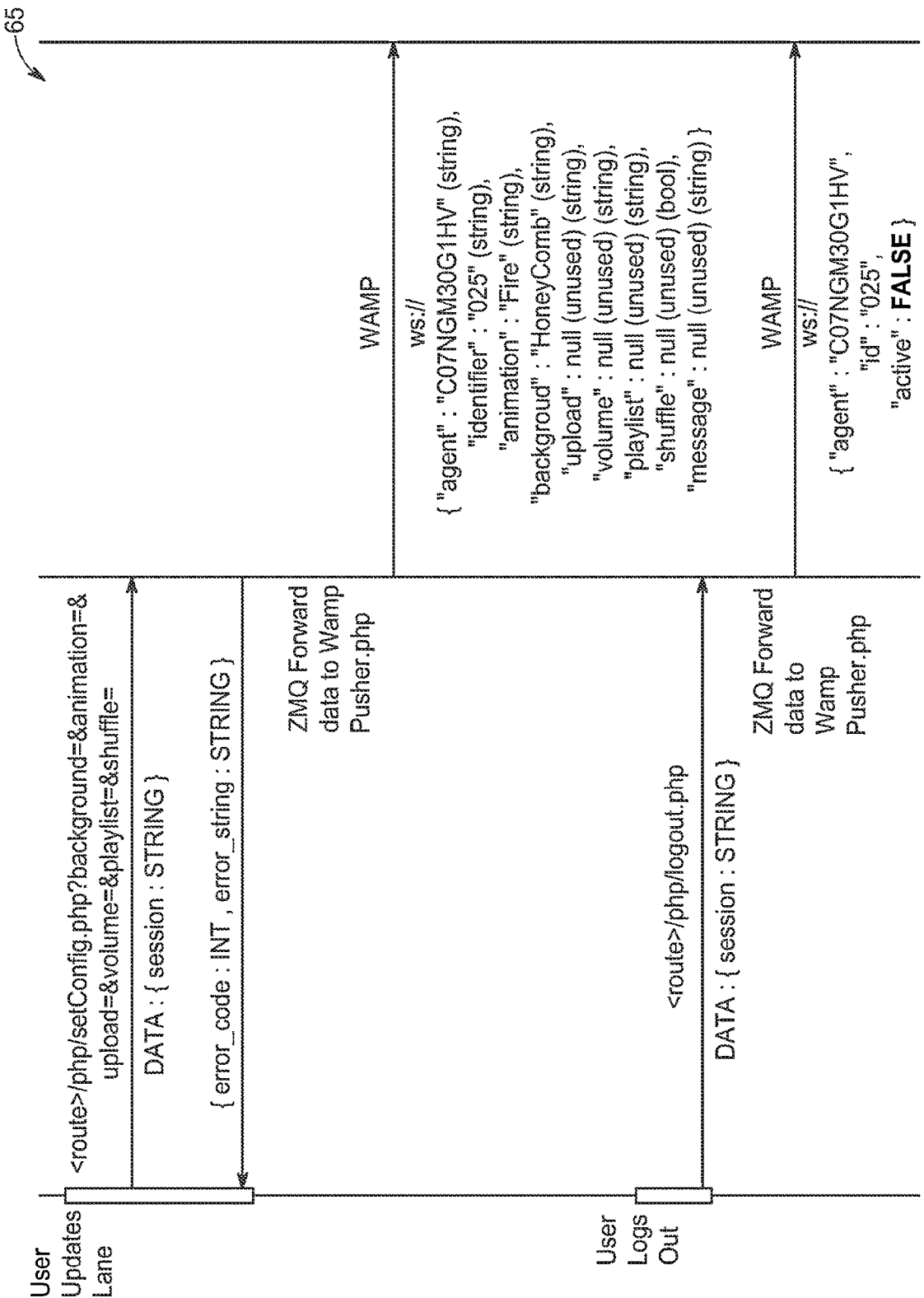
Figure 19C:
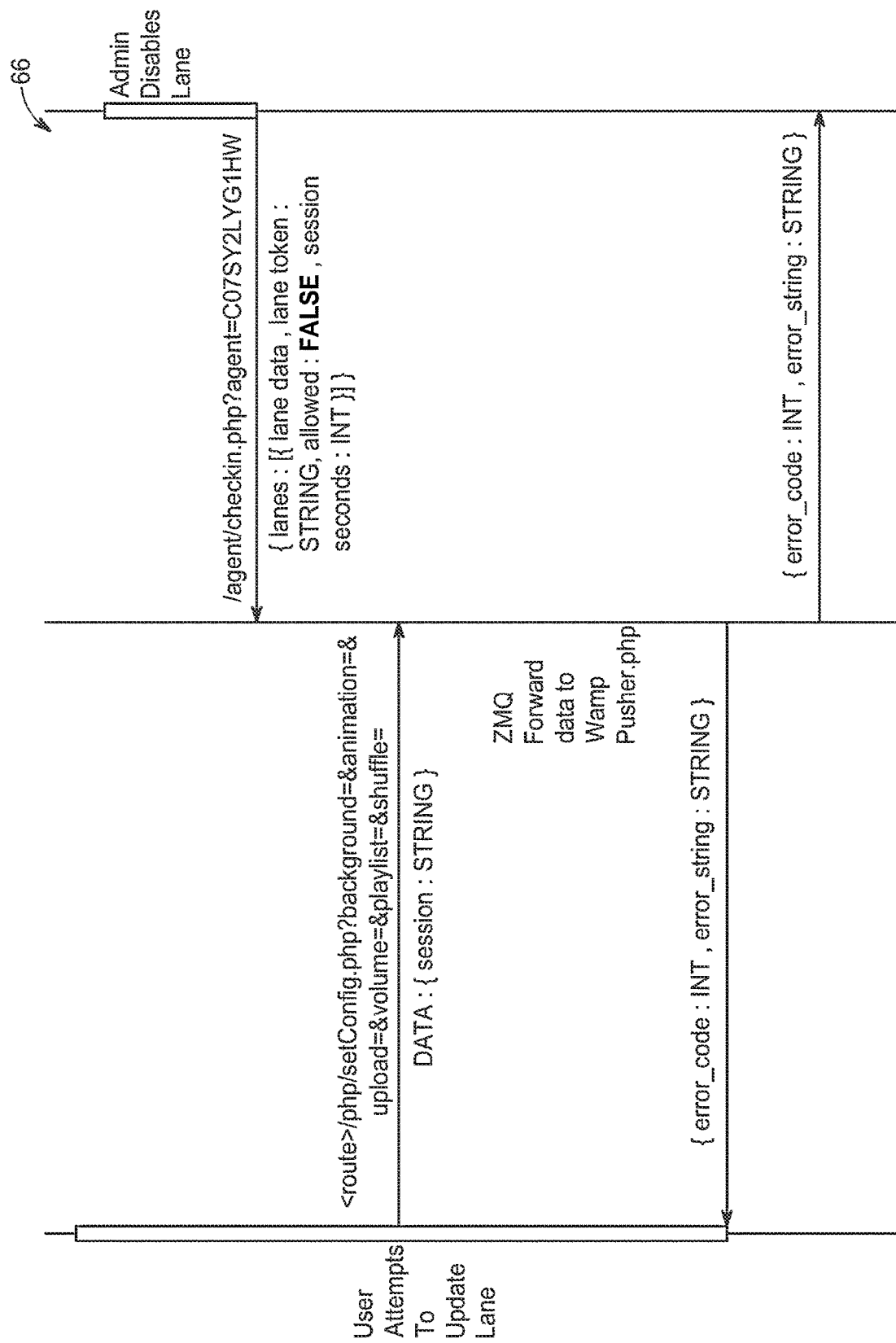

Referring now to FIGS. 19A-19C, a communication history 64-65 between the mobile wireless communications device 202, the cloud platform 205a, and the local server 205b is shown. Starting at the top of FIG. 19A, the administrator computing device 217 enables a bowling lane, and the pairing token (e.g. the QR code) is displayed on the bowling lane. Next, the user opens the software application on the mobile wireless communications device 202, which commences communication with the cloud platform 205a. The mobile wireless communications device 202 is configured to send over the pairing token, which is forwarded to the local server 205b. Once the pairing token has been authenticated, the mobile wireless communications device 202 fetches the bowling lane data.

Moving to the top of FIG. 19B, the user of the mobile wireless communications device 202 updates the bowling lane to have the selected game characteristics. Once the gaming session is complete, the user of the mobile wireless communications device 202 logs out of the application. In FIG. 19C, the communication history 66 for when the administrative computing device 217 revokes a bowling lane from the mobile wireless communications device 202 and associated user.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A bowling enhancement system for at least one bowling lane, the bowling enhancement system comprising:
   a computing device;
   a mobile wireless communications device;
   at least one sensor arranged over the at least one bowling lane and configured to generate image data of the at least one bowling lane;
   at least one projector arranged over the at least one bowling lane and configured to generate a set of projected images onto the at least one bowling lane;
   a local server coupled to the at least one sensor, the at least one projector, and the computing device; and
   a cloud platform cooperating with the local server, the local server configured to
      generate a pairing token and transmit the pairing token to a given projector, the given projector being adjacent a foul line of the at least one bowling lane,
      cause the given projector to project the pairing token onto the at least one bowling lane behind the foul line on an approach, the mobile wireless communications device configured to ingest the pairing token,
      when receiving the pairing token from the mobile wireless communications device through the cloud platform and when authenticating the pairing token for the at least one bowling lane,
         establish a communication link between the mobile wireless communications device and the local server via the cloud platform, and
         cause the mobile wireless communications device to display a user interface menu for selecting a plurality of game characteristics for a bowling game, the plurality of game characteristics for the bowling game comprising a plurality of bowling bowl animations, and a plurality of bowling lane backgrounds,
      receive the selected game characteristics from the mobile wireless communications device via the cloud platform,
      initialize the bowling game for the at least one bowling lane based upon the selected game characteristics,
      determine a tracking path of a bowling ball traveling on the at least one bowling lane based upon the image data of the at least one bowling lane, and
      selectively change the set of projected images based upon the tracking path of the bowling ball and the selected game characteristics;
   the computing device configured to disable the at least one bowling lane for the mobile wireless communications device.

2. The bowling enhancement system of claim 1 further comprising a plurality of speakers coupled to the local server and configured to output corrective prompts to a user when errors occur during establishing the communication link between the mobile wireless communications device and the local server via the cloud platform.

3. The bowling enhancement system of claim 1 wherein the local server and the cloud platform are configured to present corrective prompts to a user.

4. The bowling enhancement system of claim 1 wherein the user interface menu is configured to receive a text message for display in the set of projected images.

5. The bowling enhancement system of claim 1 wherein the plurality of bowling lane backgrounds comprises a live bowling lane background, a static bowling lane background, and a user-specific bowling lane background.

6. The bowling enhancement system of claim 1 wherein the pairing token comprises at least one of a quick response (QR) code, a bar code, and an alphanumeric text string.

7. The bowling enhancement system of claim 1 wherein the mobile wireless communications device comprises an image sensor configured to ingest the pairing token.

8. The bowling enhancement system of claim 1 wherein the at least one bowling lane comprises a plurality of bowling lanes; and wherein the at least one projector is arranged over the plurality of bowling lanes and configured to generate a plurality of sets of projected images onto the plurality of bowling lanes.

9. The bowling enhancement system of claim 1 wherein the at least one bowling lane comprises a plurality of bowling lanes; and wherein the local server is configured to generate respective unique pairing tokens for each bowling lane.

10. A bowling system for at least one bowling lane having a computing device, a mobile wireless communications device, and a cloud platform cooperating with the computing device and the mobile wireless communications device, the bowling system comprising;
   at least one sensor arranged over the at least one bowling lane and configured to generate image data of the at least one bowling lane;
   at least one projector arranged over the at least one bowling lane and configured to generate a set of projected images onto the at least one bowling lane; and
   a local server cooperating with the cloud platform and coupled to the at least one sensor, the at least one projector, and the computing device, the local server configured to
      generate a pairing token and transmit the pairing token to a given projector, the given projector being adjacent a foul line of the at least one bowling lane,
      cause the given projector to project the pairing token onto the at least one bowling lane behind the foul line on an approach, the mobile wireless communications device configured to ingest the pairing token,
      when receiving the pairing token from the mobile wireless communications device through the cloud platform and when authenticating the pairing token for the at least one bowling lane,
         establish a communication link between the mobile wireless communications device and the local server via the cloud platform, and
         cause the mobile wireless communications device to display a user interface menu for selecting a plurality of game characteristics for a bowling game, the plurality of game characteristics for the bowling game comprising a plurality of bowling bowl animations, and a plurality of bowling lane backgrounds,
      receive the selected game characteristics from the mobile wireless communications device via the cloud platform,
      initialize the bowling game for the at least one bowling lane based upon the selected game characteristics,
      determine a tracking path of a bowling ball traveling on the at least one bowling lane based upon the image data of the at least one bowling lane, and selectively change the set of projected images based upon the tracking path of the bowling ball and the selected game characteristics;

the computing device configured to disable the at least one bowling lane for the mobile wireless communications device.

11. The bowling system of claim 10 further comprising a plurality of speakers coupled to the local server and configured to output corrective prompts to a user when errors occur during establishing the communication link between the mobile wireless communications device and the local server via the cloud platform.

12. The bowling system of claim 10 wherein the local server and the cloud platform are configured to present corrective prompts to a user.

13. The bowling system of claim 10 wherein the user interface menu is configured to receive a text message for display in the set of projected images.

14. The bowling system of claim 10 wherein the plurality of bowling lane backgrounds comprises a live bowling lane background, a static bowling lane background, and a user-specific bowling lane background.

15. The bowling system of claim 10 wherein the pairing token comprises at least one of a quick response (QR) code, a bar code, and an alphanumeric text string.

16. A method for operating a bowling enhancement system for at least one bowling lane, the method comprising:

using at least one sensor to generate image data of at least one bowling lane;

operating at least one projector to generate a set of projected images onto the at least one bowling lane;

operating a local server cooperating with a cloud platform for generating a pairing token and transmit the pairing token to a given projector, the given projector being adjacent a foul line of the at least one bowling lane, causing a given projector to project the pairing token onto the at least one bowling lane behind the foul line on an approach for ingestion by a mobile wireless communications device, when receiving the pairing token from the mobile wireless communications device through the cloud platform and when authenticating the pairing token for the at least one bowling lane, establishing a communication link between the mobile wireless communications device and the local server via the cloud platform, and causing the mobile wireless communications device to display a user interface menu for selecting a plurality of game characteristics for a bowling game, the plurality of game characteristics for the bowling game comprising a plurality of bowling bowl animations, and a plurality of bowling lane backgrounds, receiving the selected game characteristics from the mobile wireless communications device via the cloud platform, initializing the bowling game for the at least one bowling lane based upon the selected game characteristics, determining a tracking path of a bowling ball traveling on the at least one bowling lane based upon the image data of the at least one bowling lane, and selectively changing the set of projected images based upon the tracking path of the bowling ball and the selected game characteristics; and operating a computing device to disable the at least one bowling lane for the mobile wireless communications device.

17. The method of claim 16 further comprising operating a plurality of speakers coupled to the local server and configured to output corrective prompts to a user when errors occur during establishing the communication link between the mobile wireless communications device and the local server via the cloud platform.

18. The method of claim 16 wherein the local server and the cloud platform are configured to present corrective prompts to a user.

19. The method of claim 16 wherein the user interface menu is configured to receive a text message for display in the set of projected images.

20. The method of claim 16 wherein the plurality of bowling lane backgrounds comprises a live bowling lane background, a static bowling lane background, and a user-specific bowling lane background.

* * * * *